United States Patent [19]
Barney et al.

[11] Patent Number: 5,928,213
[45] Date of Patent: Jul. 27, 1999

[54] FLEXIBLE MULTIPLE COMPARTMENT MEDICAL CONTAINER WITH PREFERENTIALLY RUPTURABLE SEALS

[75] Inventors: Ward W. Barney, Mission Viejo; Steven L. Smith, Lake Forest, both of Calif.

[73] Assignee: B. Braun Medical, Inc., Bethlehem, Pa.

[21] Appl. No.: 08/967,687

[22] Filed: Nov. 12, 1997

Related U.S. Application Data

[63] Continuation-in-part of application No. 08/837,927, Apr. 11, 1997, which is a continuation-in-part of application No. 08/647,583, May 13, 1996, abandoned.

[51] Int. Cl.$^6$ .............................................. A61M 37/00
[52] U.S. Cl. ........................... 604/410; 604/416; 604/89; 206/219; 206/221
[58] Field of Search ................................. 604/82, 85, 87, 604/89–91, 408–410, 416, 56; 206/219, 221, 568, 438; 383/38, 39, 41, 111; 428/412, 426

[56] References Cited

U.S. PATENT DOCUMENTS

| | | | |
|---|---|---|---|
| 2,483,636 | 10/1949 | Hardesty | 128/227 |
| 2,663,298 | 12/1953 | Rose | 128/214 |
| 3,074,544 | 1/1963 | Bollmeier et al. | 206/47 |
| 3,257,072 | 6/1966 | Reynolds | 233/26 |
| 3,520,471 | 7/1970 | Faust | 229/56 |
| 3,545,671 | 12/1970 | Ross | 233/26 |
| 3,554,256 | 1/1971 | Anderson | 150/8 |
| 3,608,709 | 9/1971 | Pike | 206/47 A |
| 3,749,620 | 7/1973 | Montgomery | 156/73 |
| 3,756,389 | 9/1973 | Firth | 206/47 A |
| 3,794,490 | 2/1974 | Nerwin | 96/76 C |
| 3,809,224 | 5/1974 | Greenwood | 206/219 |
| 3,847,279 | 11/1974 | Montgomery | 206/219 |
| 3,882,259 | 5/1975 | Nohara et al. | 428/35 |

(List continued on next page.)

FOREIGN PATENT DOCUMENTS

| | | |
|---|---|---|
| 626563 | 4/1994 | Japan . |
| 2675049 | 7/1997 | Japan . |

OTHER PUBLICATIONS

Inoue, Fujio, A New Package For A Kit Product: A Multiple Chamber Plastic Bag Packaging Parenteral Powder Drug And Diluent, PDA Asian Symposium & Exhibit, Tokyo '94.

McGaw, Inc., *Discussion Guide*, (DUPLEX™ Focus Groups) Oct. 24, 1994, (3 pages).

Engineering Drawing No. S6272, entitled "DUPLEX CONTAINER, Oct. 1994".

*Primary Examiner*—John G. Weiss
*Assistant Examiner*—David J. Cho
*Attorney, Agent, or Firm*—Christie, Parker & Hale, LLP

[57] ABSTRACT

A flexible container is provided for the storage and mixing together of diluents and medicaments. The container incorporates multiple compartments, separated by preferentially peelable seals, in which the diluents and medicaments are stored. The container is constructed of thermoplastic materials having high oxygen and moisture barrier properties which allows the container to be stored for extended periods of time without degrading the contents. The peelable seals are ruptured by manipulation of the container to thereby mix the contents together for delivery through standard IV arrangement to a patient. The seals are constructed such that the seal between the diluent and medicament compartments is preferentially ruptured such that a liquid medicament and a diluent are always mixed before the combined solution is accessible for administration. The container is fillable with a single component liquid medicament which may be susceptible to sloshing or turbulence. Turbulence is minimized by eliminating the internal gaseous head space by initially forming the head space with a low molecular weight gas such as helium. The helium is allowed to diffuse into the atmosphere and the head space collapses as a result.

40 Claims, 11 Drawing Sheets

U.S. PATENT DOCUMENTS

| | | | |
|---|---|---|---|
| 3,911,640 | 10/1975 | Rausing | 53/21 FC |
| 3,946,871 | 3/1976 | Sturm | 206/498 |
| 3,964,604 | 6/1976 | Prenntzell | 206/219 |
| 3,985,135 | 10/1976 | Carpenter et al. | 128/214 D |
| 4,010,786 | 3/1977 | Aguettant et al. | 150/8 |
| 4,183,434 | 1/1980 | Watt | 206/438 |
| 4,198,972 | 4/1980 | Herb | 128/214 |
| 4,223,512 | 9/1980 | Buchner | 53/425 |
| 4,224,367 | 9/1980 | Scholle | 428/76 |
| 4,236,652 | 12/1980 | Beguhn | 222/92 |
| 4,252,846 | 2/1981 | Romesberg et al. | 428/35 |
| 4,270,533 | 6/1981 | Andreas | 128/214 F |
| 4,284,672 | 8/1981 | Stillman | 428/35 |
| 4,375,145 | 3/1983 | Mosse et al. | 53/425 |
| 4,396,382 | 8/1983 | Goldhaber | 604/28 |
| 4,396,383 | 8/1983 | Hart | 604/56 |
| 4,401,214 | 8/1983 | Kleckers | 206/219 |
| 4,402,402 | 9/1983 | Pike | 206/219 |
| 4,409,775 | 10/1983 | Brody et al. | 53/167 |
| 4,410,321 | 10/1983 | Pearson et al. | 604/56 |
| 4,417,607 | 11/1983 | Scholle et al. | 141/1 |
| 4,432,763 | 2/1984 | Manschot et al. | 604/262 |
| 4,452,030 | 6/1984 | Inada | 53/426 |
| 4,458,811 | 7/1984 | Wilkinson | 206/219 |
| 4,465,488 | 8/1984 | Richmond et al. | 604/414 |
| 4,467,588 | 8/1984 | Carveth | 53/425 |
| 4,484,920 | 11/1984 | Kaufman et al. | 604/416 |
| 4,496,046 | 1/1985 | Stone et al. | 206/219 |
| 4,507,114 | 3/1985 | Bohman et al. | 604/111 |
| 4,519,499 | 5/1985 | Stone et al. | 206/219 |
| 4,528,220 | 7/1985 | Hwo | 428/35 |
| 4,530,202 | 7/1985 | Powell et al. | 53/426 |
| 4,548,023 | 10/1985 | Danby et al. | 53/452 |
| 4,566,251 | 1/1986 | Spisak et al. | 53/167 |
| 4,588,554 | 5/1986 | Kaartinen et al. | 422/61 |
| 4,600,613 | 7/1986 | Yoshida | 428/35 |
| 4,602,910 | 7/1986 | Larkin | 604/87 |
| 4,608,043 | 8/1986 | Larkin | 604/87 |
| 4,610,684 | 9/1986 | Knox et al. | 604/416 |
| 4,614,267 | 9/1986 | Larkin | 206/221 |
| 4,619,650 | 10/1986 | Wisdom | 604/408 |
| 4,622,032 | 11/1986 | Katsura et al. | 604/122 |
| 4,629,080 | 12/1986 | Carveth | 215/11 |
| 4,693,052 | 9/1987 | Rebmann et al. | 53/167 |
| 4,702,963 | 10/1987 | Phillips et al. | 428/426 |
| 4,711,359 | 12/1987 | White et al. | 215/11.1 |
| 4,731,053 | 3/1988 | Hoffman | 604/89 |
| 4,742,667 | 5/1988 | Müller et al. | 53/167 |
| 4,770,295 | 9/1988 | Carveth et al. | 206/219 |
| 4,803,102 | 2/1989 | Raniere et al. | 428/35.2 |
| 4,805,767 | 2/1989 | Newman | 206/219 |
| 4,813,210 | 3/1989 | Masuda et al. | 53/425 |
| 4,837,084 | 6/1989 | Warren | 428/349 |
| 4,874,656 | 10/1989 | Rantanen | 428/216 |
| 4,910,085 | 3/1990 | Raniere et al. | 428/412 |
| 4,910,147 | 3/1990 | Bacehowski et al. | 435/296 |
| 4,961,495 | 10/1990 | Yoshida et al. | 206/209 |
| 4,965,108 | 10/1990 | Biel et al. | 428/35.7 |
| 4,965,109 | 10/1990 | Tucker et al. | 428/35.7 |
| 4,969,915 | 11/1990 | Hatanaka et al. | 53/425 |
| 4,979,347 | 12/1990 | Shibauchi et al. | 53/167 |
| 4,992,247 | 2/1991 | Foti | 422/304 |
| 4,994,056 | 2/1991 | Ikeda | 604/410 |
| 5,007,232 | 4/1991 | Caudill | 53/426 |
| 5,011,719 | 4/1991 | Gehrke et al. | 428/35.7 |
| 5,014,494 | 5/1991 | George | 53/425 |
| 5,069,017 | 12/1991 | Fabricius | 53/426 |
| 5,071,686 | 12/1991 | Genske et al. | 428/35.7 |
| 5,114,004 | 5/1992 | Isono et al. | 206/222 |
| 5,129,212 | 7/1992 | Duffey et al. | 53/426 |
| 5,131,760 | 7/1992 | Farmer | 383/210 |
| 5,176,634 | 1/1993 | Smith et al. | 604/87 |
| 5,207,509 | 5/1993 | Herbert | 383/38 |
| 5,209,347 | 5/1993 | Fabisiewicz et al. | 206/219 |
| 5,240,525 | 8/1993 | Percec et al. | 156/60 |
| 5,257,985 | 11/1993 | Puhl | 604/410 |
| 5,259,844 | 11/1993 | Bilstad et al. | 604/403 |
| 5,267,646 | 12/1993 | Inoue et al. | 206/204 |
| 5,287,961 | 2/1994 | Herran | 206/219 |
| 5,306,269 | 4/1994 | Lewis et al. | 604/403 |
| 5,423,421 | 6/1995 | Inoue et al. | 206/219 |
| 5,425,447 | 6/1995 | Farina | 206/219 |
| 5,431,496 | 7/1995 | Balteau et al. | 383/38 |
| 5,458,244 | 10/1995 | Emori | 206/527 |
| 5,462,526 | 10/1995 | Barney et al. | 604/85 |
| 5,484,633 | 1/1996 | Murschall et al. | 428/35.7 |
| 5,487,940 | 1/1996 | Bianchini et al. | 428/349 |
| 5,496,302 | 3/1996 | Minshall et al. | 604/410 |
| 5,501,887 | 3/1996 | Tanaka et al. | 428/35.2 |

FLEXIBLE MULTIPLE COMPARTMENT MEDICAL CONTAINER WITH PREFERENTIALLY RUPTURABLE SEALS

CROSS-REFERENCE TO RELATED APPLICATIONS

The present application is related to co-pending application entitled "FLEXIBLE MEDICAL CONTAINER WITH SELECTIVELY ENLARGEABLE COMPARTMENTS AND METHOD FOR MAKING SAME", filed on even date herewith, both of which are continuations-in-part of co-pending application Ser. No. 08/837,927 filed Apr. 11, 1997, which is a continuation-in-part of application Ser. No. 08/647,583 filed May 13, 1996, now abandoned, both of which are entitled "FLEXIBLE, MULTIPLE-COMPARTMENT DRUG CONTAINER AND METHOD OF MAKING AND USING SAME", all commonly owned by the Assignee of the present invention, the entire disclosures of which are expressly incorporated herein by reference.

FIELD OF THE INVENTION

The present invention relates to flexible, sterile containers, used for storing and mixing liquid medicaments and liquid diluents in a sterile environment and for dispensing mixtures therefrom. More particularly, the container is fabricated with peelable seals configured to promote mixing of the liquid binary components, while minimizing liquid medicament bolus formation at the outlet port. Once filled, the container is de-blocked with a low molecular weight gas to eliminate the head-space and prevent sloshing.

BACKGROUND OF THE INVENTION

Various medicament (drug) solutions are commonly administered intravenously (via IV) from sterile containers to patients. Oftentimes, such solutions comprise a mixed combination of a liquid diluent, e.g., an aqueous dextrose or NaCl solution, and a liquid medicament. Desirably, the medicament and diluent are stored separately in the container under aseptic conditions and are not mixed together until immediately prior to use so as to prevent degradation of the final product. Common packaging of the diluent and medicament is often further complicated by the character of the medicament which may be in liquid form and, thus, susceptible to hydraulic pressure on the container, as well as degradation under light or oxygen exposure.

Accordingly, various such medicaments which become unstable with time in solution have typically been separately stored in gas-impermeable vials, containers, or the like prior to their use. Before being administered to a patient, medicaments stored in this fashion must be mixed, or diluted in, a physiological solutions or diluents which are also preserved separately. While able to maintain medicament sterility and effectiveness, separate component storage is cumbersome and involves the risk of bacteriological contamination during handling, mixing, and subsequent administration to a patient. Accordingly, medical containers have been developed which include compartments for storing unstable medicaments and compartments which contain diluent liquids. Immediately prior to IV administration to a patient, the components are placed in communication with one another so that the contents can be mixed together aseptically.

Multiple compartment containers, which allow separate storage of diluents and medicaments are known. Such containers are disclosed, for example, in U.S. Pat. No. 4,608,043 to Larkin, U.S. Pat. No. 5,176,634 to Smith et al. and U.S. Pat. No. 5,462,526 to Barney et al. U.S. Pat. Nos. 4,608,043, 5,176,634 and 5,462,526 are expressly incorporated herein in their entirety by reference. The compartments of the containers disclosed in the foregoing patents are separated from one another by peelable or frangible heat seals. The seals are ruptured by manipulation of the container so that the contents of the compartments can be mixed together to thereby form a solution which is delivered to the patient through a standard IV arrangement.

Solution containers on the market today are generally manufactured of materials comprising PVC plastic. PVC material is generally quite murky in aspect, making it difficult to inspect the contents of a container manufactured of such material. Consequently, inspecting such containers for leaks and moisture contamination is quite difficult, as is verifying whether complete mixing of the medicament and diluent has taken place prior to administration to a patient. In addition, various hazardous chemicals are used in the manufacture of PVC material which must be disposed of in an environmentally safe manner. PVC containers must be carefully disposed of following their use, because PVC emits a toxic gas when incinerated and includes a toxic plasticizer that can leach into the surrounding environment if the container is buried in a landfill. This toxic plasticizer is also able to leach into IV solutions, making PVC containers unsuitable for use with several types of drugs, particularly liquid drugs.

The medicament compartment of such multi-compartment containers is desirably protected from atmospheric gasses as well as from exposure to UV and ambient radiation in order to avoid degradation of the medication contained therein. One known method of protecting the medicament compartment from, for example, moisture and oxygen contamination is disclosed in U.S. Pat. No. 5,267,646 to Inouye, et al., in which the medicament compartment is surrounded by a secondary compartment containing a desiccant and an oxygen absorber. Free oxygen and moisture vapor is allowed to penetrate the material of the secondary compartment and is absorbed by the desiccant and oxygen scrubber before it is able to effect the medicament. Although this method is able to provide some degree of protection for the medicament compartment against free oxygen and water vapor, the method requires an additional layer of material (a secondary compartment) to be provided around the medicament, making it more difficult to inspect the contents of the medicament container prior to reconstitution. Moreover, no protection is provided against the effects of UV or ambient light degradation of the contents of the medicament compartment.

U.S. Pat. No. 5,176,634 to Smith et al., discloses a medical container having multiple compartments separated by peelable seals which may be ruptured by manually applying pressure to the exterior of the container. The container is formed of two sheets of flexible materials which are sealed together along their perimeter. Separate diluent and medicament compartments are formed in the container by frangible heat seals which span the sides of the container and, thus, divided into separate compartments. The rear sheet is impermeable to water vapor and is constructed of a laminated material having an inner layer of polypropylene, a middle layer of aluminum foil and an outer layer of polyester film. Vapor impermeability of the rear sheet extends the shelf life of the product by reducing, by half, the permeation of diluent vapor from the container, and the permeation of vapor from the atmosphere into the medicament compartment. Additional reduction and vapor permeability is provided for the medicament compartment by peelably affixing a third sheet of laminated material, which is identical to the rear sheet, over the container front sheet in the region of the medicament compartment. This third sheet of laminated material is sized to cover the medicament compartment and, in combination with the rear sheet, forms a vapor impermeable enclosure which surrounds the medicament compartment.

However, once the vapor impermeable third sheet is peeled-away from the medicament compartment, the medicament compartment is no longer enclosed and is, therefore, susceptible to vapor permeation from the atmosphere. In addition, diluent vapor is able to migrate from the diluent compartment into the medicament compartment through the material of the peelable seal which separates them. Because the vapor impermeable covering is routinely peeled-away from the medicament compartment during a hospital's incoming inspection procedure, long term storage of such containers is problematic. In cases where the medicament is a liquid, and highly susceptible to degradation by water vapor, the shelf life of a container that has had its vapor impermeable covering removed is often no more than a few days.

Containers developed for binary combinations of liquid medicaments and liquid diluents are also quite susceptible to internal hydrostatic pressure developed by squeezing the container or by an impact such as might be caused by dropping the container onto a hard surface. When this internal hydrostatic pressure develops, the peelable or frangible seals which separate the diluent and medicament compartments, or the seal which separates the medicament from the outlet compartment may inadvertently peel-open, causing either premature mixing of the container's binary components, or cause a bolus of liquid medicament to enter the outlet compartment.

In various prior art multiple compartment containers, simple frangible or peelable seals are used to divide medicament and diluent compartments to preclude inadvertent delivery of any of the components prior to mixing. Such simple seals are formed across the container in its width direction, and have a generally uniform cross-sectional thickness and length throughout the entire seal. When the container is manipulated in order to rupture the seals, and thereby mix the medicament and diluent together prior to delivery, the mechanical pressure of the liquid diluent against a seal is relieved as soon as any portion of the seal ruptures. The diluent is then allowed to enter the medicament compartment. Such a partial rupture of a linear seal often does not allow complete delivery of the fluid contents of the diluent compartment to the medicament. Significant quantities of diluent may remain in the diluent compartment, trapped in the corners defined by the sidewall of the compartment and the left and right ends of the seal. Such partial rupture may also result in incomplete mixing of medicaments with diluents and incomplete delivery of the mixed product to the patient.

In addition, in the case where the medicament is a liquid, the peelable seal separating the liquid medicament from an outlet compartment may preferentially rupture before the seal separating the liquid medicament from the diluent compartment. An undiluted portion of liquid medicament may thus be present in the outlet compartment when the set port is pierced by an IV set drug spike, allowing a bolus of relatively undilute medicament to enter the IV line to a patient. The danger to a patient in this circumstance cannot be minimized.

It is therefore desirable to provide an IV container having multiple compartments for storage of liquid diluents and medicaments in a single package to have peelable seals dividing the compartments which are configured to be substantially completely ruptured along their entire length for complete combination and mixing of the contents, and to be preferentially rupturable between the medicament and diluent compartments to ensure that the container's binary components are substantially mixed before the seal leading to the outlet compartment is ruptured. Such a seal configuration would assure delivery of the total quantity of the final mixed product while minimizing the potential for medicament bolus formation. It is thus desirable that the container arrangement preclude the inadvertent delivery of any of the components prior to mixing, but in the event of improper mechanical manipulation of the container, the container arrangement must preclude the inadvertent delivery of undiluted liquid medicament. The container should further allow verification of the condition of the components following receipt of the container by a hospital's pharmaceutical services, but prior to storage and subsequent dispensing.

In certain cases where the diluent is an active pharmaceutical component of a binary mixture, such as for emulsions, liposomes, and the like, it is further desirable that the container be entirely filled with the liquid, such that there is no gaseous head-space remaining in the diluent compartment. Emulsions and liposomes, for example, are particularly susceptible to sloshing which can degrade the substances to the point of ineffectivity.

When containers are filled with these materials, the formed film web is commonly blown-open with a jet of dry nitrogen or filtered air to define a volume into which a measured amount of liquid is introduced. Oftentimes the liquid volume contained in such a container must be controlled to within about 1 part in 100. It is extremely difficult to vent the filtered air or nitrogen from the container after the container is filled with a liquid. The container walls must be slowly squeezed until the air is vented through the fill port but before any of the liquid escapes.

While effective to a certain degree, such a method of minimizing gaseous head-space in a container adds a significant amount of time to the filling process with a consequent reduction in the final product volume. In addition, the filling apparatus must include an additional step (the headspace removal step) as well as additional costly and complex apparatus to effect the step.

It is therefore desirable that the container be manufactured and filled in such a manner that the head-spaced formed during the filling step may be substantially removed in the final product without the addition of a processing step or separate apparatus.

SUMMARY OF THE INVENTION

The present invention provides a container having multiple compartments separated by preferentially peelable seals which may be ruptured by manually applying pressure to the exterior of the container. The container is formed of two sheets of flexible, laminated materials which are sealed together along their perimeters. Separate compartments in the container are formed by preferentially peelable heat seals. In the first embodiment of the invention, three compartments are formed in the container; the first compartment contains a liquid diluent, the second compartment contains a liquid medicament which is mixed with liquid diluent by separating a first preferentially peelable seal dividing the two compartments, and the third compartment is an outlet compartment from which the mixed medicament solution is dispensed.

In one aspect of the invention, the preferentially peelable seals are constructed with different widths such that the first preferentially peelable seal, between the diluent and medicament compartments will preferentially rupture in response to hydraulic pressure generated by manipulating the container, regardless of whether the hydraulic pressure is developed in the diluent or the medicament compartment. The second preferentially peelable seal is substantially wider than the first, such that it is prevented from rupturing unless and until the first preferentially peelable seal opens allowing the diluent and medicament to mix. In one embodiment of the invention, the first and second preferentially peelable seals are constructed to have a substantially rectangular shape and extend across the compartment, overlapping a permanent seal to either side.

In another aspect of the present invention, the first preferentially peelable seal is formed as a compound curve while the second preferentially peelable seal spans the two sides of the common peripheral edge of the container and is substantially rectangular in shape. The first and second preferentially peelable seals are each characterized by a width dimension, where the width of the first preferentially peelable seal is substantially smaller than the width of the second preferentially peelable seal. The compound curvature of the first preferentially peelable seal defines at least one stress riser characterized by an inflection point having a convex contour oriented in the direction of the diluent compartment. In addition, the first preferentially peelable seal includes at least a second stress riser characterized by an inflection point having a convex contour oriented in the direction of the medicament compartment. The inflection points of the stress risers define initiation points at which the first seal preferentially ruptures in response to hydraulic pressure. Rupture is initiated at an inflection point of a stress riser oriented in the direction of the compartment from which hydraulic pressure is developed.

In yet another aspect of the present invention, a pressure equalization channel is formed between the diluent compartment and the outlet compartment such that diluent liquid is allowed to flow around three sides of the medicament compartment. The pressure equalization channel maintains equalization of ΔP between the outlet and diluent compartments such that only the first preferentially peelable seal is capable of being ruptured by hydraulic pressure. In addition, a safety seal is formed between the second preferentially peelable seal and the container's outlet port so as to provide an additional element of safety against activation of a liquid medicament without its being mixed with the diluent.

In an additional embodiment of the invention, a flexible container is provided for combined storage and administration of a medicament liquid which may be susceptible to turbulence. The flexible container is constructed of flexible front and rear sheets sealed together along a common peripheral edge. A peelable seal extends between two sides of a common peripheral edge and separably joins the front and rear sheets to define a compartment containing the medicament liquid and an outlet compartment. The medicament compartment is filled with a turbulence susceptible liquid and the head space is adjusted with a jet of a low molecular weight gas such as helium. After the container is filled and the low molecular weight gas introduced, the medicament compartment is sealed. The selective permeabilities between the low molecular weight gas and air causes the low molecular weight gas to leave the container's head space without being replaced by an equal volume of air, thus substantially reducing or substantially eliminating the head space without effecting the medicament dose.

In an additional aspect of the embodiment of the invention, the outlet compartment contains a quantity of a second gas, such as air or nitrogen, such that when the peelable seal is ruptured by manipulating the container, the second gas is allowed to rise to the surface of the liquid medicament and form a meniscus. The meniscus allows the fluid level of the medicament in the medicament compartment to be visually verified against graduations formed in the container material.

BRIEF DESCRIPTION OF THE DRAWINGS

These and other features, aspects and advantages of the present invention will be more fully understood when considered with regard to the following detailed description, appended claims and accompanying drawings wherein:

DETAILED DESCRIPTION

Figure 1:
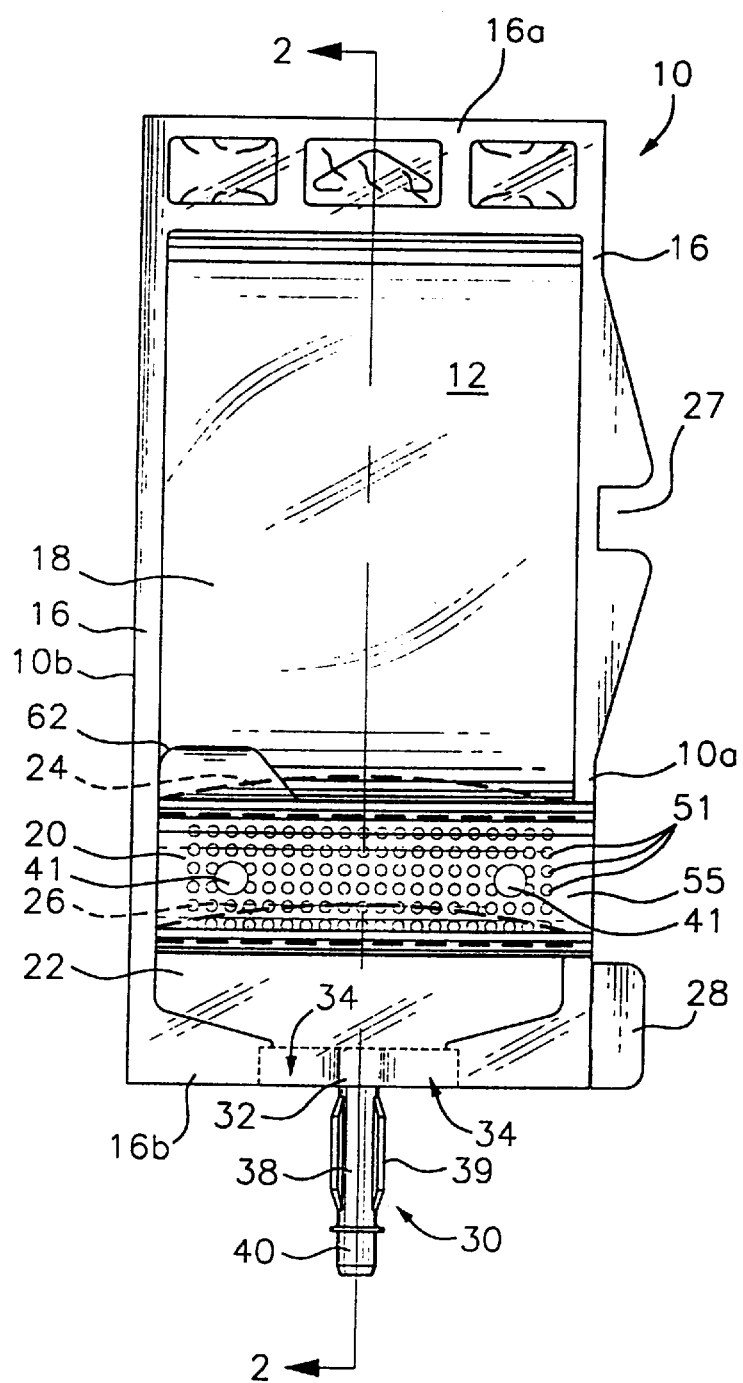
FIG. 1 is a semi-schematic front view of one exemplary embodiment of the container provided in accordance with practice of the present invention showing the arrangement of the compartments.
Figure 2:
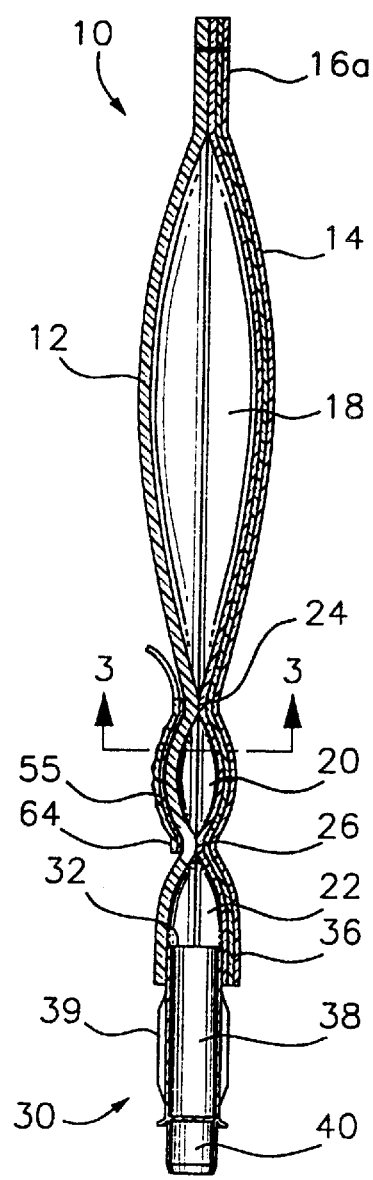
FIG. 2 is a semi-schematic side cross-sectional view taken along the line 2—2 of FIG. 1, depicting the flexible sheets formed in the container, with the thickness of the layers in the sheets exaggerated for clarity.

Referring to FIGS. 1 and 2, there is shown schematic front and cross-sectional side views, respectively, of a preferred embodiment of a flexible, sterile container 10 provided in accordance with practice of principles of the present invention. Although the container can be viewed in any orientation, for purposes of explanation the position of the compartments of the container relative to one another are described with reference to the orientation of FIGS. 1 and 2. The container 10 is formed from a front sheet 12 and a back or rear sheet 14 (shown only in FIG. 2). The front and back sheets may be constructed of a single layer of flexible material or multi-layer laminates of flexible material which will be described in greater detail below. The sheets forming the container can be provided separately and then sealed together along their common peripheral edges with a permanent edge seal 16 formed along the entire periphery of the container. Such peripheral seals may vary in configuration and width. A patterned seal, such as that depicted on the top seal portion 16a and the bottom seal portion 16b of FIG. 1, may be used to define grasping areas which allow clinical personnel to handle the container and allow for the container to be attached to, for example, an IV support stand. Alternatively, the front and rear sheets can be formed from a single film sheet which is subsequently folded-over and sealed together by means of the heat seal which extends around the periphery of the lapped-together portions of the container films. However formed, the sealed-together sheets shall be referred to herein as the "shell" or "body" of the container.

In the exemplary embodiment, the container 10 is partitioned into three separate compartments; an upper compartment 18, an intermediate compartment 20 and a lower compartment 22, each of which is sterile. The upper and intermediate compartments, 18 and 20, are separated from one another by a first peelable seal 24, while the intermediate and lower compartments, 20 and 22, are separated from one another by a second peelable seal 26. The peelable seals 24 and 26 extend between and span the two sides of the container, i.e., from the permanent peripheral seal on the right side of the container 10a to the permanent peripheral seal on the left side of the container 10b. The peelable seals 24 and 26 join the interior faces of the front and rear sheets together in the region of the seals. A "peelable" seal, as the term is used herein, is a seal which is sufficiently durable to allow normal handling of the container yet which will peel-open, allowing separation of the front sheet from the back sheet in the region of the seal, under hydraulic pressure applied by manipulating the container, thereby allowing mixing and dispensing of the container contents. A peelable seal is formed by partially melting together the polymeric material present in the adjoining interior faces of the front and back sheets. The seal is obtained by a heat sealing process by which heat and pressure is applied to the seal area with varying times, temperatures, and pressures which will be described in greater detail below. Conversely, the peripheral edge seal 16 is significantly stronger than the "peelable" seals and will not be ruptured by the hydraulic pressures generated to separate the peelable seals. Each of the peelable seals, 24 and 26, are individually configured so as to peel-open in a manner that preferentially allows liquid medicament and liquid diluent to mix first, and then allow the mixed components to be dispensed.

In a typical application for the container 10 of the present invention, the upper compartment 18 is filled with a liquid diluent in the intermediate compartment 20 is filled with a medicament, typically provided in liquid form. The lower compartment 22 functions as a security interface for an outlet port 30 and remains empty until the container is used. The outlet port 30 extends downwardly and comprises a body portion 38 and a nozzle 40 which is configured for attachment to a standard IV administration device. A cap (not shown) is provided to cover the nozzle and maintain its sterility. The cap is removed just prior to attachment of an IV set to the outlet port. Ribs 39 are provided in spaced-apart relationship about the body portion 38 of the outlet port 30 to give a surface that may be easily grasped when attaching an IV set to the container. In the illustrated embodiment, four ribs 39 are equally spaced-apart about the circumference of the body portion 38 and extend longitudinally along the surface of the body portion. While four longitudinal ribs are depicted, one having skill in the art will recognize that various other types of surface articulation may be provided which will allow the port to be easily grasped. Such articulation may comprise circumferential ribs, transverse ribs, knurling or crosshatching of the body portion surface, and the like.

The materials employed in the front and rear sheets of the container 10 are selected based on the material to be stored therein. Preferably, at least one of the sheets is transparent to allow the contents of the container to be visually inspected and to allow the level of the solution in the container to be visually verified during dispensing. Suitable materials for the fabrication of the transparent sheet are typically single-layer and multi-layer laminated polymer films.

In particular, whether constructed of a single-layer or a multi-layer laminated polymer film, the materials comprising the front 12 and rear 14 sheets of the container 10 are chosen for their clarity and transparency. Conventional polyvinylchloride (PVC) container materials are generally quite murky in appearance, making it difficult to adequately view the interior of the container and determine the levels of any fluids contained therein or the presence of particulate matter. This is a particularly dangerous situation when administering medication intravenously. It is imperative that a nurse or clinical worker be able to tell, at a glance, that any such medication being administered from a medical container is free from particulate matter.

Figure 3:
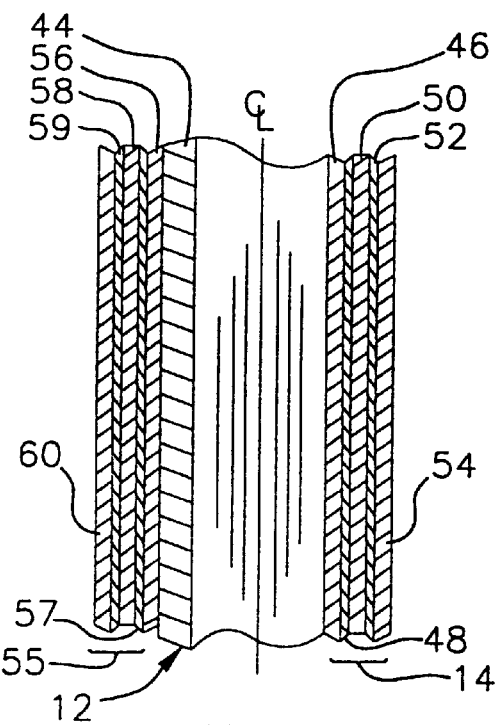
FIG. 3 is a semi-schematic fragmentary cross-sectional view taken along the line 3—3 of FIG. 2, showing the configuration of the flexible sheets of a first embodiment of the container of the present invention.

In a first embodiment of the container of the present invention, depicted in fragmentary schematic cross-section in FIG. 3, the front sheet 12 is constructed of a transparent, single-layer thermoplastic polymer film 44. In the exemplary embodiment, the transparent film 44 suitably comprises a blend of about 80% by weight polypropylene-polyethylene copolymer available from Fina Oil and Chemical Company of Deerpark, Tex., having a commercial designation of Z9450, and about 20% by weight styrene ethylene-butylene styrene thermoplastic elastomer, available from Shell Chemical Corporation under the trade name KRATON® and having a commercial designation G1652. G1652 thermoplastic elastomer is a two-phase polymer with polystyrene domains (end blocks) in a rubbery poly (ethylene-butylene) matrix and is typically provided in crumb form. In practice, the film is made by mixing pellets of the Z9450 co-polymer resin and G1652 thermoplastic elastomer, in crumb form, in an 80%/20% by weight ratio, in a high shear mixer and melting and repelletizing the mixture. Compounding the G1652 crumb in high shear equipment can cause the temperature to rise, so care should be taken so that the temperature is not allowed to exceed about 500° F. Subsequently, the transparent film 44 is formed from the blended pellets in a commercial extrusion apparatus. The transparent polymer film 44 comprising the front sheet 12 may be constructed with varying thicknesses, depending on the use to which the container is put and the durability required for that particular application. Suitable thicknesses for the material comprising the front sheet 12 may range from about 3 to about 15 mils, but in the illustrated container embodiment, the transparent polymer film 44 comprising the front sheet 12 is preferably about 12 mils thick.

Although the composite material chosen for forming the transparent polymer film 44 (which may be referred alternatively as the "80:20 film") were chosen based on their clarity and transparency, the film is also particularly suitable for forming both "peelable" seals and permanent edge seals along the periphery of the container 10. As will be described in greater detail below, the 80:20 film, in accordance with the invention, is able to accommodate both lower-temperature peelable seal and higher-temperature permanent seal formation processes without effecting the material's integrity or its ability to provide an effective peelable seal.

For certain combinations of diluents and medicaments, the rear sheet 14 can be formed with the same single layer composition and configuration as the front sheet 12. Alternatively, multi-layer films, which include layers that are impermeable to moisture and light and are able thereby to extend the shelf life of a filled container, are preferred films for construction of the rear sheet. In the embodiment of the container illustrated in FIG. 3, a three-layer laminate rear sheet 14 is employed which is impermeable to water vapor and to light in order to preserve the effectiveness and activity of the binary components (the unmixed medicament and diluent liquids), thus increasing the shelf life of the filled container.

In the exemplary embodiment, the rear sheet 14 includes an inner, seal layer 46 on its inwardly facing surface, constructed of an 80%/20% wt/wt blend of polypropylene-polyethylene copolymer and styrene ethylene-butylene styrene thermoplastic elastomer the blend having a thickness of about 3 to 6 mils (the 80:20 film). In one exemplary embodiment, the inner seal layer (the 80:20 film layer) 46 is a 6 mil. thick composition, which is bonded by means of a suitable transparent adhesive 48 to an approximately 0.7 mil to 1.3 mil, and preferably about 1.0 mil, high-barrier aluminum foil layer 50. An outer, high melting temperature layer 54 is provided on the rear sheet's outwardly facing surface and is bonded to the high-barrier aluminum foil layer 50 by means of a suitable transparent adhesive 52. In the embodiment of FIG. 3, the inner adhesive layer 48 comprises a modified aliphatic polyester polyurethane adhesive, available from Liofol Company of Cary, N.C., under the commercial designation TYCEL 7909. The outer adhesive layer 52 comprises a modified aromatic polyester polyurethane adhesive, also available from Liofol Company of Cary, N.C., under the commercial designation TYCEL 7900. The aliphatic adhesive comprising the inner adhesive layer 48 may also be used for the outer adhesive layer 52, although the converse is not the case. The aromatic adhesive 52, while providing a stronger bond than the aliphatic version, has the potential for introducing extremely undesirable aromatic compounds into either the liquid diluent or liquid medicament, through the 80:20 film layer. Accordingly, the aromatic adhesive 52, when used, is only used when the aluminum foil layer 50 is interposed as a barrier between it and the interior of the container. The aluminum foil layer 50 is suitably constructed of a commercially available 1.0 mil aluminum foil, such as ALCAN 1145, available from the Alcan Rolled Products Company, of Louisville, Ky.

Were the aluminum foil layer 50 to remain exposed as the exterior layer of the rear sheet, the heat sealing process, used to form both the peripheral edge seals and the transverse peelable seals would damage the foil layer and degrade its integrity and ability to provide a barrier. An outer high temperature layer 54, constructed of a relatively high-melting polymer, functions as a protective layer over the aluminum film to prevent contact between the foil layer and the hot platens of a heat seal apparatus. Further, the high-temperature layer 54 functions as a heat seal release (also termed mold release) layer because the material does not melt and stick to the heat seal platens at the temperatures used during the seal formation processes. Pressure and temperature can thus be applied to the exterior of the container without the need for special coatings on the platens.

The outer high-temperature layer 54 is preferably a polyethylene terephthalate (designated herein as PET) available from Rhone-Poulanc under the commercial designation TERPHANE 10.21, having a thickness in the range of from about 0.4 to about 0.06 mils. In the illustrated embodiment, the thickness dimensions of the components of the multi-layer laminate film 14 are preferably about 0.48 mils for the outer, high-temperature polyester layer 54, about 1.0 mils for the high-barrier aluminum foil layer 50, and about 6.0 mils for the 80:20 inner seal layer film 46.

It has been found that preferable material choices for the front and rear sheets, which result in optimum performance of the peelable seals, incorporate an interfacing seal layer on each sheet comprising the 80:20 film. Alternatively, the inner facing seal layers of the front and rear sheets may comprise polypropylene-polyethylene co-polymer and styrene ethylene-butylene styrene thermoplastic elastomer blends having differing relative percentages. The relative percentages used will depend on the characteristics of the various seals contemplated for use in connection with a particular medical container, and the temperature and pressure parameters of the seal formation processes. Other types of flexible films which may be useful in the construction of the front and rear sheets of the shell of the container 10 of the present invention, as well as the inner facing seal layers on both sheets, are disclosed in U.S. Pat. Nos. 4,803,102, 4,910,085, 5,176,634 and 5,462,526, the entire disclosures of which are expressly incorporated herein by reference.

In certain applications, particularly where the medicament is susceptible to contamination by water vapor or degradation caused by radiation in the visible or UV portion of the spectrum, additional protection for the intermediate (medicament) compartment 20 of the container 10 is preferred. Such additional protection is provided to preclude moisture, oxygen, and/or light transmission through the film comprising the front of the medicament compartment in order to form an enclosure around the medicament and protect the medicament from degradation. Such additional protection allows the container 10 to be stored for substantial periods of time without loosing medicinal efficacy.

Referring in particular to FIGS. 2 and 3, an opaque film 55 having high-barrier properties, is employed to cover the intermediate or medicament compartment 20. The opaque film 55 interposes a barrier to moisture vapor and free oxygen permeation into the medicament compartment and, in the exemplary embodiment, comprises a multi-layer laminate structure which includes a high-barrier aluminum foil layer. The use of an opaque aluminum foil laminate helps prevent the medicament contained in the intermediate compartment 20 from being degraded due to exposure to invisible light and UV radiation. Thus, in the present embodiment, the opaque aluminum foil comprising both a protective film 55 and the rear sheet 14 encloses the medicament compartment and prevents penetration of UV invisible spectrum light into the medicament compartment 20 from either direction.

The high-barrier protective film 55 is a multi-layer laminate, constructed of an inner seal layer 56 on its inwardly facing surface. In the exemplary embodiment, the seal layer 56 is a soft co-extrusion coated resin comprising a modified ethylenevinylacetate polymer available from the Dupont Chemical Company under the commercial designation APPEEL 1181, provided in a thickness of from about 0.2 to about 0.4 mils. An aluminum foil layer, such as ALCAN 1145, from about 0.7 to about 1.3, and preferably about 1.0, mils thickness is bonded to the inner seal layer 56 by means of a suitable transparent adhesive 57. An outer, heat seal release layer 60 comprising a polyethyleneterephthalate (PET) film, such as TERPHANE 10.21, approximately 0.48 mils in thickness, forms the outwardly facing surface of the high-barrier protective film 55. The heat seal release layer 60 is bonded over the aluminum foil layer 58 by means of a suitable transparent adhesive 59. The adhesive layers 57 and 59, of the present embodiment, suitably comprise a modified aliphatic polyester polyurethane adhesive available from Liofol Company under the commercial designation TYCEL 7909. Alternatively, the outer transparent adhesive 59 may comprise a modified aromatic polyester polyurethane adhesive, also available from Liofol Company, under the commercial designation TYCEL 7900. Because of the dangers attendant with aromatic compounds leaching into either the liquid diluent or liquid medicament, the aromatic adhesive is only used on the outside of the aluminum foil layer. The inner adhesive layer 57 will preferably comprise an aliphatic adhesive.

Because the inner seal layer 56 of the high-barrier protective film 55 is a co-extrusion coated resin, it is able to form a peelable seal, over a broad temperature range, when applied to a number of different materials. Materials to which such a co-extrusion coated resin may form a peelable seal include acrylonitrile-butadiene-styrene (ABS), high density polyethylene (HDPE), high impact polystyrene (HIPS), polypropylene (PP), polystyrene (PS), polyvinylchloride (PVC), and the 80:20 film which comprises the front sheet 12 of the container. The high-barrier protective film 55 may thus be removably (peelably or separably) affixed to the outer surface of the front sheet 12 covering the intermediate or the medicament compartment 20.

Preferably, the high-barrier protective film 55 is removable (peelable or separable) from the container 10 prior to its use, to allow visual examination of the state of the medicament in the medicament compartment 20. In the exemplary embodiment, best seen in connection with FIG. 1, a protective film 55 includes an extending tab 62 which may be grasped in order to peel the protective film 55 away from the transparent front sheet 12. The contents of the medicament compartment 20 are thereby exposed for easy visual inspection.

As can be understood by referring to FIG. 1, the high-barrier protective film 55 is not affixed to the container by forming a seal therebetween over the entire surface area of the film; rather, the film 55 is sealed to the underlying material over only a portion of its surface area. Those portions of the high-barrier protective film 55 which are not sealed to the underlying material define a regular array or pattern of generally circular raised dimples 51 which are the tactile residue of a heat seal bar into which a rectangular array of holes has been cut. When the heat seal bar is pressed over the surface of the high-barrier protective film 55, a heat seal is provided only on the surface contact regions of the heat seal bar and not in the regions where the bar material has been removed (the holes). Since pressure is also applied during the process along with heat, the high-barrier protective film 55 takes a reverse impression from the heat seal head, thus giving rise to the textured, raised dimpled surface. The dimples 51 allow the high-barrier protective film 55 to be adequately sealed to the underlying material (the front sheet) of the medical container but, at the same time, provides for easy removal of the film 55 without application of undue force. Were the entire protective layer 55 to be heat sealed onto the surface of the container, a relatively strong bond would be created and a larger than desired amount of force would be required to completely peel it away. By reducing the surface area of the seal, a smaller force (proportional to the seal area) is required to remove the peelable aluminum strip. It is apparent from the foregoing description, that the amount of force required to remove the peelable aluminum strip is inversely proportional to the number of dimples (51 of FIG. 1) formed in the film 55. Depending on the use to which the medical container is put, a more or less easily removable high-barrier protective layer may be easily constructed by merely increasing or decreasing the number of dimples formed in the layer during the heat seal process. It should be noted, however, that the high-barrier film 55 has its entire periphery, with the exception of the tab 62, heat-sealed to the underlying material of the container. Forming a full peripheral seal around the high-barrier film 55 ensures that the film's barrier properties fully extend across the medicament compartment 20.

Figure 4:
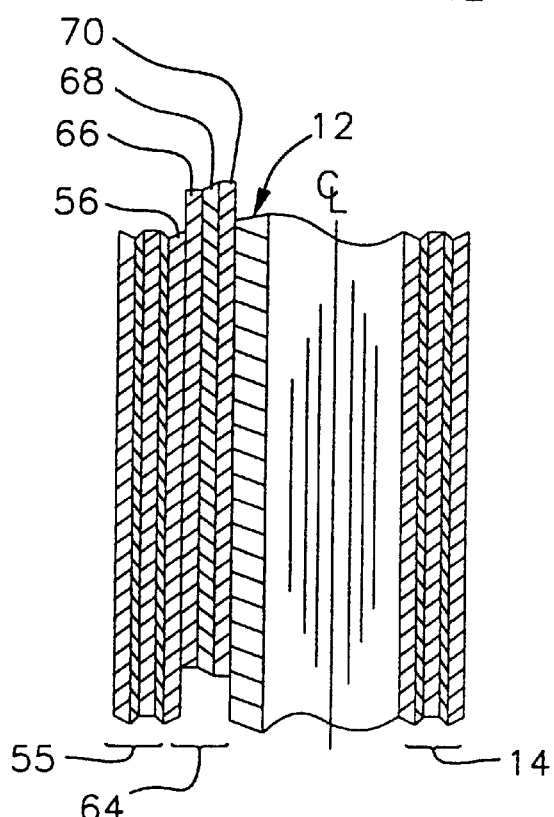
FIG. 4 is a semi-schematic fragmentary cross-sectional view of the configuration of the flexible sheets of a first embodiment of the invention depicting an optional, transparent, high-barrier intermediate film.

In practical use, the filled container is received by a hospital's pharmacy services and is then stored for a period of time against eventual need. Typically, prior to dispensing, a pharmacist removes the high-barrier foil layer 55 from the surface of the container to expose the medicament compartment 20 in order that the integrity of the contents may be visually verified. If the container is not put into use at that time, it is returned to the pharmacy and dispensed again at the next request. Removal of the peelable high-barrier film 55 from the medicament compartment 20 leaves the contents of the medicament compartment susceptible to degradation by moisture, light and permeable oxygen. It is desirable that filled containers in accordance with the present invention are able to be stored in pharmacy services for periods of time up to 30 days prior to use without the medicament being severely degraded by exposure to moisture and free oxygen after the high-barrier protective film has been removed from the medicament compartment. Accordingly, in one embodiment of the present invention, as is illustrated in FIG. 4, a transparent high-barrier intermediate laminate film 64 is optionally interposed between the high-barrier aluminum foil-containing protective film 55 and the 80:20 material of the container front sheet comprising the medicament compartment 20. The transparent high-barrier intermediate film 64 covers and protects the contents of the medicament 20 after the peelable protective film 55 is removed from the container. The transparent high-barrier intermediate film exhibits barrier properties which protects a medicament from at least moisture vapor and oxygen permeation for a substantial period which, depending on the specific activity of the medicament, may be as long as 30 days. In other words, the opaque high-barrier protective film 55 in combination with the transparent high-barrier intermediate film 64 forms a high-barrier protective covering over the medicament compartment.

Pertinent to the characterization of the protective covering as a "high" barrier covering is the degree to which the protective covering is impermeable to various penetrant gasses. Polymers are categorized by the degree to which they restrict passage of penetrant gasses, e.g., oxygen or moisture vapor. The categories range from "high" barrier (low permeability) to "low" barrier (high permeability). The category in which a polymer is classified may vary according to the penetrant gas. As used herein, the term "high"-barrier, when it refers to moisture vapor permeability, means a film of a permeability of less than about 1.5 g/mil/m$^2$/24 hr/atm, at 30° C., 100% R.H.. As used herein, the term "high"-barrier when it refers to oxygen permeability, means a film with a permeability of less than about 50 cc/mil/m$^2$/24 hr/atm, at 25° C., 100% R.H..

In one exemplary embodiment, the transparent high-barrier intermediate film 64 comprises a triple layer high-barrier laminate structure which is significantly resistant to free oxygen and water vapor permeability so as to protect the contents of the medicament compartment and increase the shelf life of a binary container. In the illustrated embodiment, the intermediate film layer 64 includes an outer layer 66 of silica deposited polyethyleneterephthalate (also termed SiO$_x$ coated polyester or SiO$_x$ coated PET) available from Mitsubishi Kasei under the commercial designation TECH BARRIER H. The sealant layer 56 of the high-barrier protective film 55 is placed in contact with the outer layer 66 of the intermediate film 64. An intermediate layer 66 comprising a silica deposited (SiO$_x$ coated) polyvinylalcohol (PVA) film available from Mitsubishi Kasei under the commercial designation TECH BARRIER S is bonded to the outer layer 66. On its inward facing surface, the transparent high-barrier intermediate film 64 suitably comprises an inner seal layer 70 formed of a polypropylene-polyethylene copolymer. The copolymer may be blended with styrene ethylene-butylene styrene thermoplastic elastomer in various proportions, but a 100% polypropylene-polyethylene copolymer layer is preferred. The individual layers of the intermediate laminate film 64 are adhesively bonded to one another. For clarity, these adhesive layers are not shown in the figure but comprise a modified aliphatic polyester polyurethane laminate available from Liofol Company under the commercial designation TYCEL 7909. The inner seal layer 70 is securely affixed to the outer surface of the container front sheet 12 by an appropriate permanent heat or ultrasonic seal, an adhesive pressure seal, or the like. The transparent high-barrier intermediate laminate film 64 is sized, horizontally and vertically, to cover the entire surface area of the medicament compartment and also extends to cover the peelable and permanent seals formed adjacent the medicament compartment.

As is the case with the flexible, thermoplastic materials which comprise the front sheet 12 of the container body, the three-layer laminate structure of the intermediate layer 64 is substantially optically clear and transparent to allow inspection of the contents of the medicament compartment 20. Thus, unlike polyvinylchloride (PVC), and other similar materials, which are fairly hazy (translucent), the intermediate layer 64 of the present invention is visually transparent while imparting considerable protection against moisture and free oxygen degradation.

In particular, the barrier properties of the transparent, high-barrier intermediate laminate film 64 are substantially greater than those of conventional films, such as low-density polyethylene (LDPE), medium-density polyethylene (MDPE), linear low-density polyethylene (LLDPE), ethylene-vinylacetate copolymers (EVA), or blends of these polymers, in areas important to the functioning of the container, e.g moisture and oxygen permeability. The oxygen permeability of the intermediate layer 64 is approximately 10 cc/mil/m$^2$/24 hr/atm. Conversely, the oxygen permeability of EVA copolymers, LDPE and MDPE, respectively, are approximately 2500 (EVA 5%), 8300 (LDPE), and 8500 (MDPE) cc/mil/m$^2$/24 hr/atm. The oxygen permeability of LLDPE is approximately the same or slightly higher than LDPE. Thus, the oxygen permeability of the transparent high-barrier intermediate layer 64 is orders of magnitude less than the oxygen permeability of polymers typically used to construct binary medical containers. In other words, the barrier properties of the high-barrier intermediate layer 64 are improved by several orders of magnitude over the barrier properties of polymers typically used to construct these containers.

Because of the intermediate laminate film's barrier properties, the peelable aluminum foil-containing protective film 55 may be removed by a pharmacist in order to perform visual inspection of the container's contents prior to dispensing, and the container may then be stored for a reasonable additional period of time without the danger of oxygen or moisture induced medicament degradation. Once the protective foil layer is removed, it is desirable that the container have a storage shelf life of about 30 days. After removal of the aluminum foil layer, the precise shelf life of the container which includes the clear high-barrier laminate film 64 depends necessarily on the moisture or oxygen sensitivity of the drug contained in the medicament compartment. Drugs with a relatively low moisture sensitivity are able to retain efficacy for periods substantially longer than 30 days by virtue of being protected by the clear high-barrier laminate film 64. In addition, drugs with an extreme moisture sensitivity, i.e., those, that would normally begin to lose effectiveness upon exposure to water vapor upon removal of the aluminum foil layer, may be stored for periods up to two weeks without loosing effectiveness because of the moisture barrier properties of the clear high-barrier film overlying the medicament compartment.

Although the intermediate film 64 has been described in the exemplary embodiment as being affixed to the outer surface of the medicament compartment, it will be apparent to one skilled in the art that the intermediate layer may be sized to cover both the medicament and diluent compartments if desired. The manner of attachment of the intermediate layer to the outer surface of the container may also be varied without departing from the spirit or scope of the invention. The intermediate layer 64 may be permanently secured to the outer surface of the container by a suitable adhesive, as well as by permanent heat or ultrasonic sealing. Alternatively, the intermediate film 64 may be removably provided on the surface of the container by adjusting the temperature and pressure characteristics of a heat seal in order to make the seal peelable. In this case, the film 64 could be peeled from the container 10 as is the case with the opaque high-barrier laminate film 55.

It should be noted that in the exemplary embodiment, the medicament is described as being in the form of a liquid. The medicament may also be in the form of a colloid, crystalloid, liquid concentrate, emulsion, or the like. In addition, the medicament may be provided as a dry powder such as antibiotic compositions or antiemetic compositions, with non-limiting examples of such being; cefizolin, cefuroxime, cefotaxime, cefoxitin, ampicillin, nafcillin, erythromycin, ceftriaxone, metoclopramide and ticar/clav. The medicament compartment need not be filled with a drug, per se. Other medical compositions such as lyophilized blood fractions, blood factor VIII, factor IX, prothrombin complex, and the like, are particularly suitable for dispensing from a container in accordance with the invention. While the container of the present invention has been described with a single medicament and diluent compartment, containers which have multiple compartments filled with different diluents and/or different medicaments, may be provided in accordance with the present invention.

Figure 5:
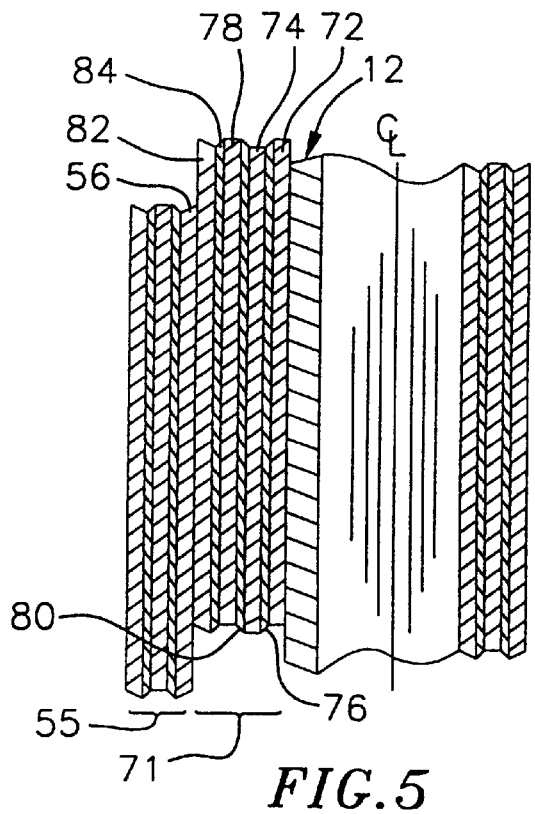
FIG. 5 is a semi-schematic fragmentary cross-sectional view showing the laminate configuration of the flexible sheets of a second embodiment of the container of the present invention depicting an optional, transparent, high-barrier intermediate film.

In an additional exemplary embodiment of the present invention, which is depicted in schematic cross-section in FIG. 5, an alternative construction is provided for the transparent, high-barrier intermediate laminate film (64 of FIG. 4), which covers the medicament compartment.

As was the case with the first exemplary embodiment, depicted in FIGS. 2,3, and 4, a clear high-barrier intermediate laminate film 71 of FIG. 5 may be provided in combination with an opaque, high-barrier aluminum foil-containing protective film (55 of FIGS. 2 and 3) disposed over the intermediate film 71 and, thus, over the medicament compartment of the container. Accordingly, the clear high-barrier intermediate film 71 in combination with an opaque high-barrier protective film comprises a high-barrier protective coating disposed over the medicament compartment. As will be described in greater detail below, the high-barrier protective covering may include either a high moisture barrier layer, a high oxygen barrier layer, or both. The opaque aluminum foil-containing protective film 55 is provided to prevent penetration of UV and visible spectrum light into the medicament compartment of the container is such protection is desired.

The alternative high-barrier intermediate laminate film is constructed of a transparent multi-layer thermoplastic polymer laminate, indicated generally at 71. The film is constructed to exhibit high moisture barrier and high oxygen barrier properties. In the exemplary embodiment of FIG. 5, the transparent, multi-layer high-barrier film 71 comprises a sealant layer 72 on its inward facing surface, preferably constructed of 100% polypropylene having a thickness of about 3.0 mils. An oxygen barrier layer 74 is laminated to the sealant layer 72 by a first bond layer 76 comprising a commercially available low density polyethylene (LDPE) extradite in combination with an activation primer. The bond layer 76 is interposed between the oxygen barrier layer 74 and the sealant layer 72. Several flexible, polymer films have been determined to be able to provide suitable barriers to oxygen permeability, as will be described further below, but the oxygen barrier layer 74 of the multi-layer high-barrier film 71 is preferably constructed from a commercially available ethylenevinylalcohol (EVOH) having a film thickness of about 0.55 mils.

Ethylenevinylalcohol is primarily noted for its barrier properties against oxygen permeability. In particular, its oxygen permeability barrier values are typically in excess of four orders of magnitude greater than conventional primary bag films such as ethylenevinylacetate (EVA), SURLYN®, medium and high-density polyethylene (MDPE, HDPE). However, while affording a considerable barrier to oxygen permeability, ethylenevinlyalcohol alone may not provide sufficient protection against water vapor permeability. Accordingly, a moisture barrier layer 78 is laminated to the ethylenevinylalcohol oxygen barrier layer 74 by a second low density polyethylene (LDPE) bonding layer 80. The moisture barrier 78 is a transparent, flexible film comprising an oriented high-density polyethylene (oHDPE) polymer available from the Tredegar Company of Richmond, Va. under the commercial designation of MONAX, grade HD. The resultant composite barrier structure includes a polyester (PET) heat sealed release layer 82 (such as TERPHANE 10.21) on its outward facing surface and which is laminated, in turn, to the moisture barrier 78 by a third low density polyethylene extradite bonding layer 84.

The multi-layer high-barrier polymeric laminate film 71 of the exemplary embodiment described in connection with FIG. 5 is a high oxygen barrier and moisture impermeable flexible film that is suitable for constructing the intermediate layer (64 of FIG. 1) covering the medicament compartment (20 of FIG. 1) of the medical container. All of the materials comprising the laminate are substantially optically clear and transparent, and do not exhibit any substantial coloration. Thus, the composite film of the illustrated embodiment of FIG. 5 is particularly suitable for covering the medicament compartment of the medical container such that its contents may be readily inspected at a glance.

A higher transparency is obtainable for the multi-layer laminate film 71 of FIG. 5 as opposed to the $SiO_x$ containing laminate film 64 of FIG. 4. In particular, while transparent, the $SiO_x$ containing film exhibits a slight yellowish color. Without being bound by theory, the higher color temperature of the multi-layer laminate film 71 (the absence of the yellowish color) is thought to be the primary reason for the laminate film's higher transparency. In addition, $SiO_x$ containing material is relatively rigid and brittle and can be cracked during the primary container manufacturing, filling and/or handling process. Because of its inherent lack of elasticity, the barrier properties of a $SiO_x$ containing film are degraded if the $SiO_x$ film is stretched more than 1% beyond its initial footprint. If the $SiO_x$ film is stretched beyond the particular amount allowed by its modulus of elasticity, the $SiO_x$ film substrate will crack, causing permeation paths to open from ambient atmosphere to the container front sheet. In addition, the state of $SiO_x$ coating technology is such that a $SiO_x$ film's barrier properties will vary from point-to-point over the surface of the film. This is because currently available $SiO_x$ sputtering processes are not able to form a smooth film of consistent thickness and density. This variability of barrier properties is typically greater than that shown by extruded polymeric materials. Extruded polymeric materials exhibit a lower thickness and density variance because of their inherent homogenous character. The barrier properties of a homogenous polymeric barrier film is primarily a function of film thickness, which can be controlled very precisely during the manufacturing process.

While preferred materials for the clear, high-barrier intermediate film would include both an oxygen barrier layer and a moisture barrier layer, alternate materials may be used to provide a medicament compartment cover which is adaptable for various particular uses. For example, one of the high-barrier layers may be omitted giving a high-barrier intermediate film which includes only a moisture barrier layer or only an oxygen barrier layer. Moreover, the high-barrier intermediate film may include a moisture barrier layer, as described above, in combination with a heat sealed release layer which is constructed from a high melting temperature material which also exhibits some oxygen barrier properties.

Table 1 is a non-limiting list showing the exemplary film 71 of FIG. 5 and four additional examples of multi-layer films or laminates useful in the fabrication of various embodiments of a clear, high-barrier, intermediate layer according to the invention. For purposes of clarity in reading the list, oHDPE refers to an oriented high-density polyethylene such as HD grade MONAX, polyvinylidenechloride coated PET refers to a product available from Dupont Chemical Company under the commercial designation 50M44, and ACLAR refers to a polychlorotrifluoroethylene film available from Allied Signal Corporation which is also known under the commercial designation ULTRX 2000.

TABLE 1

| Material of Laminate Layer 71 | Thickness, mil | Layer Description |
|---|---|---|
| 1. | | |
| PET (outside layer) | 0.48 | Heat Seal Release |
| LDPE Extradite | 0.5–1 | Bond Layer |
| oHDPE | 2 | Moisture Barrier |
| LDPE | 0.5–1 | Bond Layer |
| EVOH | .55 | Oxygen Barrier |
| LDPE Extradite/Primer | 0.5–1 | Bond Layer |
| Polypropylene (100%) (inside layer) | 3 | Sealant Layer |
| 2. | | |
| PET | 0.50 | Heat Seal Release |
| Adhesive | | Bond Layer |
| oHDPE | 2 | Moisture Barrier |
| Adhesive | | Bond Layer |
| Polypropylene (100%) | 3 | Sealant Layer |
| 3. | | |
| Polyvinylidene Chloride Coated PET | 0.50 | Heat Seal Release and Oxygen Barrier |
| Adhesive | | Bond Layer |
| oHDPE | 2 | Moisture Barrier |
| Adhesive | | Bond Layer |
| Polypropylene (100%) | 3 | Sealant Layer |
| 4. | | |
| PET | 0.48 | Heat Seal Release |
| Adhesive | | Bond Layer |
| Aclar ™ | 2 | Moisture Barrier |
| Adhesive | | Bond Layer |
| EVOH | .55 | Oxygen Barrier |
| Adhesive | | Bond Layer |
| Polypropylene (100%) | 3 | Sealant Layer |
| 5. | | |
| Polyvinylidene Chloride Coated PET | 0.50 | Heal Seal Release and Oxygen Barrier |
| Adhesive | | Bond Layer |
| Aclar ™ | 2 | Moisture Barrier |
| Adhesive | | Bond Layer |
| Polypropylene (100%) | 3 | Sealant Layer |

In accordance with practice of the present invention, each of the multi-layer laminate films discussed above, are contemplated as forming a clear high-barrier covering over the medicament compartment 20 of the medical container 10. Preferably, the rear sheet 14 of each such container is constructed of a multi-layer laminate which includes a high moisture barrier aluminum foil-containing film and which comprises the 80%/20% wt/wt film on its inwardly facing surface, as described in connection with the embodiment of FIG. 3.

Constructing the rear sheet 14 of the container from an opaque aluminum foil-containing high-barrier laminate film allows the contents of the container to be protected from exposure to UV and visible spectrum light which may degrade its contents. In practical use, the peelable aluminum foil-containing film, covering the medicament compartment, is typically removed prior to dispensing by a hospital's pharmacy services. Since the high-barrier intermediate films are optically clear, they do not provide protection against light exposure and care must be taken to prevent the contents of the medicament compartment from being inadvertently exposed to UV or intense visible spectrum light during subsequent container storage. Accordingly, the container is folded-over upon itself such that the aluminum foil-containing film (or rear sheet) forms the outward facing surface of the folded-over container and helps protect the contents of the medicament compartment from exposure to UV or intense visible spectrum light.

Use of the Container

Figure 6:
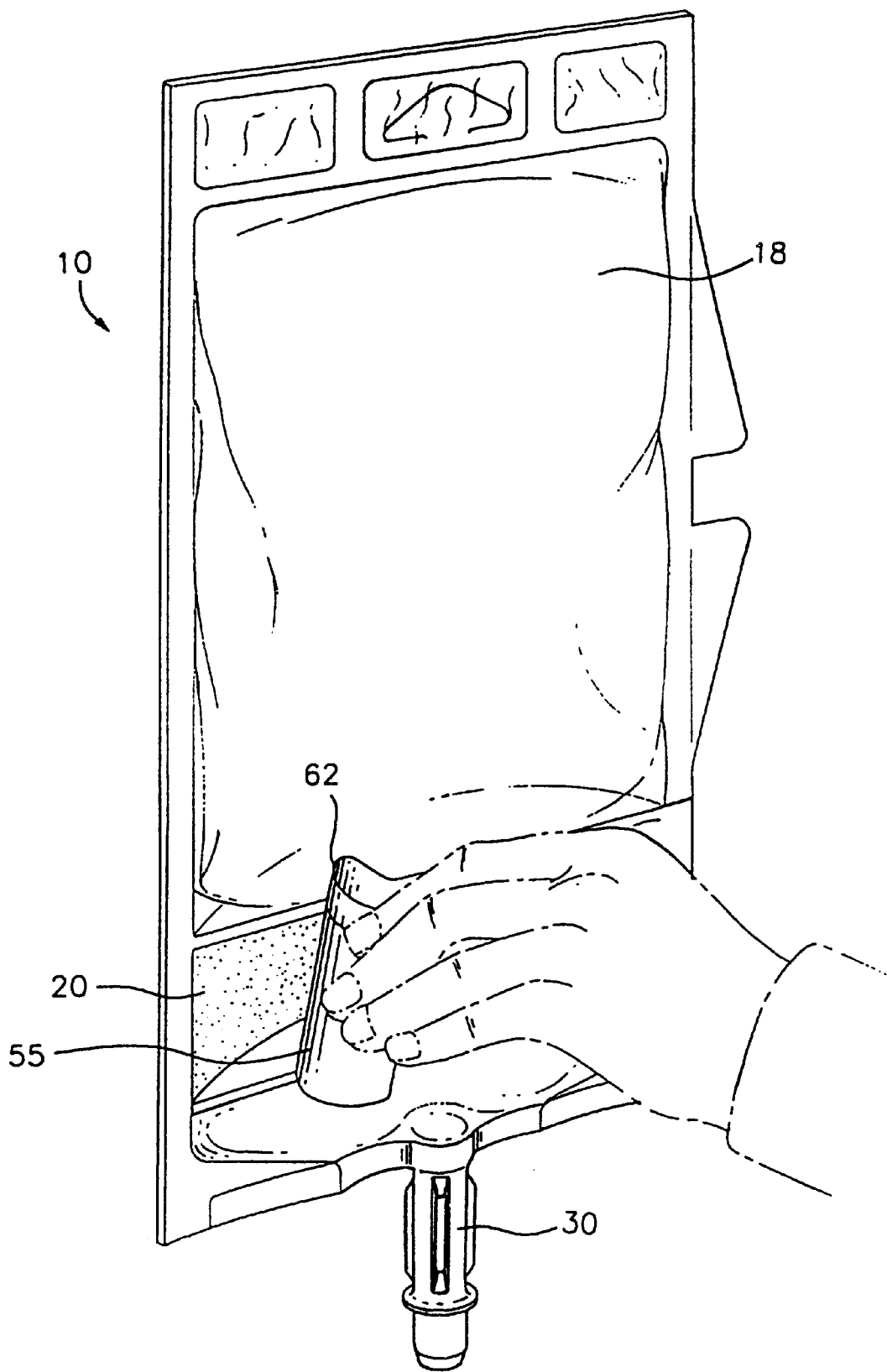
FIG. 6 is a semi-schematic pictorial view showing a peelable medicament compartment cover being removed for inspection of the liquid medicament prior to mixing and use.
Figure 7:
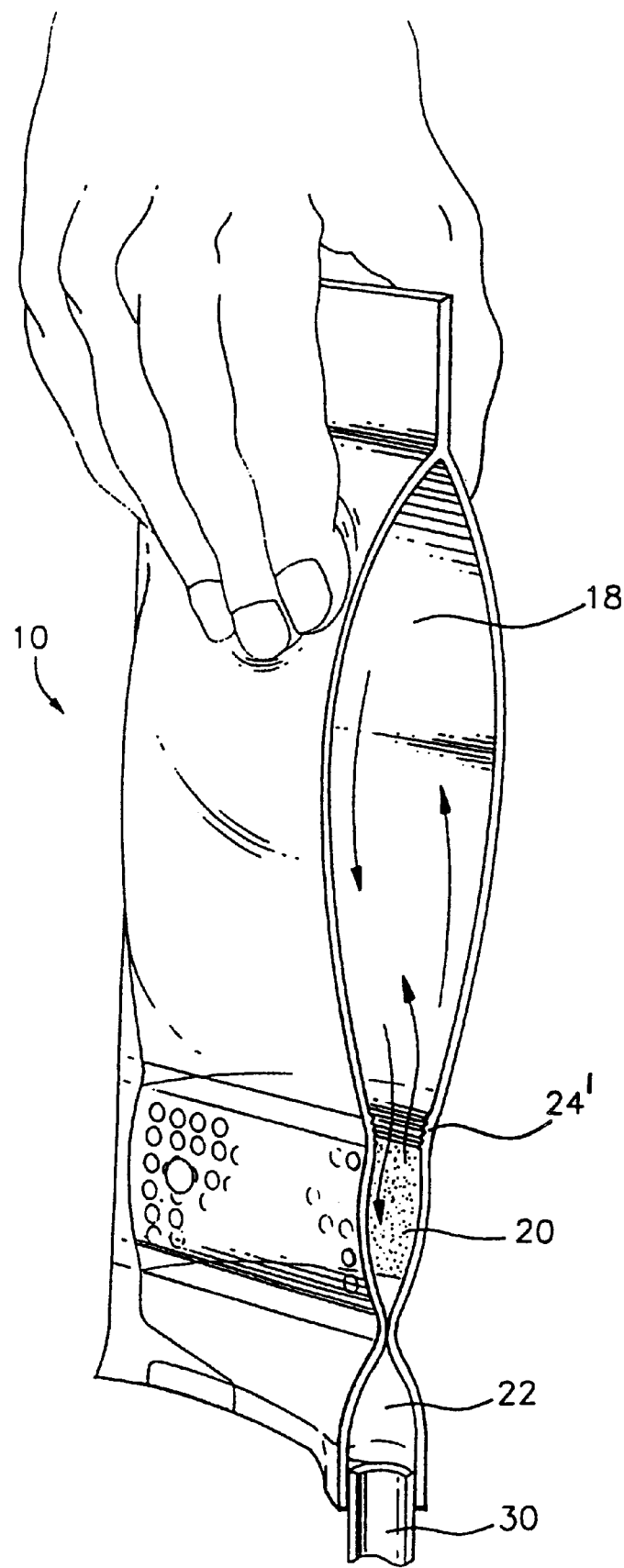
FIG. 7 is a semi-schematic pictorial cut-away view demonstrating the manipulation of the container to separate the first selectively peelable seal to thereby mix the diluent and medicament liquids.
Figure 8:
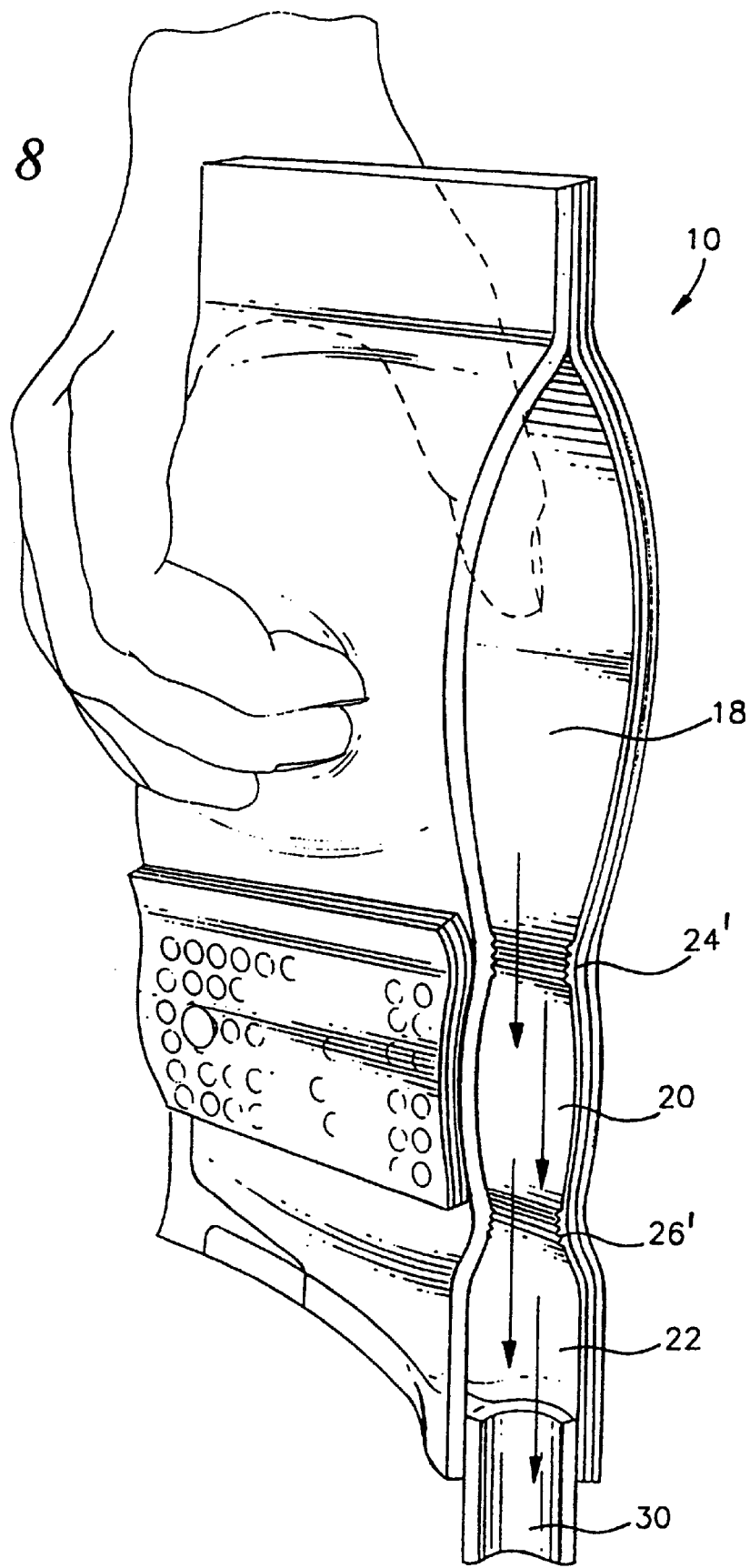
FIG. 8 is a semi-schematic pictorial cut-away view demonstrating the manipulation of the container to separate the second preferentially peelable seal to thereby dispense the medicament solution.

Use of the completed containers is substantially independent of the films used for their fabrication. A compartmented container 10 and mixing system will be received by health care personnel, typically a hospital's pharmacy services department, in the completed configuration shown in FIGS. 1 and 2. Referring now to FIG. 6, in preparing to use the container, the liquid medicament may be inspected by grasping the tab 62 on the aluminum foil-containing protective layer 55 and peeling the protective layer from the container to enable visual inspection of the intermediate compartment 20 containing a liquid medicament. If the medicament and the medicament compartment appear to be in normal condition, i.e., the peelable seals are undamaged, the liquid medicament is present in its nominal dose, its color and clarity are nominal, and the like, the solution can be mixed, as shown in FIG. 17, by manipulating the container to compress the front and rear sheets in the area of the upper diluent compartment 18. Mechanical pressure from the hydraulic forces created by manipulation of the container ruptures the first selectively peelable seal between the diluent and medicament compartments (shown in ruptured condition as 24'). Further manipulation by shaking causes mixing of the diluent and medicament liquids. Verification that complete mixing is obtained is made by visually observing the mixed solution through the clear, transparent front sheet. After mixing is complete, the second selectively peelable seal between the medicament compartment and the lower security compartment is broken, as shown in FIG. 18, by again compressing the front and rear sheets of the container to create hydraulic pressure in the container to rupture the seal (shown in ruptured condition as 26'). The mixed solution is then dispensed from the container through the outlet port 30 using a standard IV delivery set.

The arrangement of the container 10 precludes delivery of unmixed diluent liquid through the outlet port by various means as will be described in greater detail below. Further, the arrangement of the intermediate compartment 20 between the diluent compartment and the outlet port, enhances the probability of complete mixing and delivery of the medicament to the patient. For containers including a liquid diluent and powdered medicament, rupture of the first peelable seal between the diluent compartment 18 and medicament compartment 20 is essentially assured prior to rupture of the second peelable seal between the medicament compartment 20 and the lower security compartment 22 since the hydraulic forces developed in the diluent by manipulating the container cannot be transferred through the powder in the medicament compartment until the first seal has been ruptured and mixing of the diluent and powder has commenced.

In accordance with the present invention, for those cases where a liquid medicament is used, the relative size difference between the diluent compartment and the medicament compartment, and the placement of the smaller medicament compartment intermediate the larger diluent compartment and the lower or security compartment assures development of hydraulic forces which will rupture the first seal between the diluent and medicament compartments before rupture of the second seal leading to the security compartment with only minimal care.

However, even with extreme care, it is nevertheless possible to develop sufficient hydraulic pressure within an intermediate compartment which contains a liquid medicament to accidentally peel-open the second seal leading to the security compartment. In such situation, the security compartment will contain a bolus of liquid medicament which, if undiluted and delivered to a patient, can cause significant health difficulties. Accordingly, the peelable seals 24 and 26 are fabricated, in accordance with the present invention, to be selectively peelable, such that the second peelable seal 26 between liquid medicament and the outlet compartments (20 and 22) does not peel-open until and unless the first peelable seal 24 between the liquid medicament and diluent compartments is first ruptured. In accordance with practice of principles of the invention, the seals are formed in a manner to provide a uniform, predictable response to manipulation pressure and peel open completely, along their lengths, under hydraulic manipulation pressure.

Figure 9:
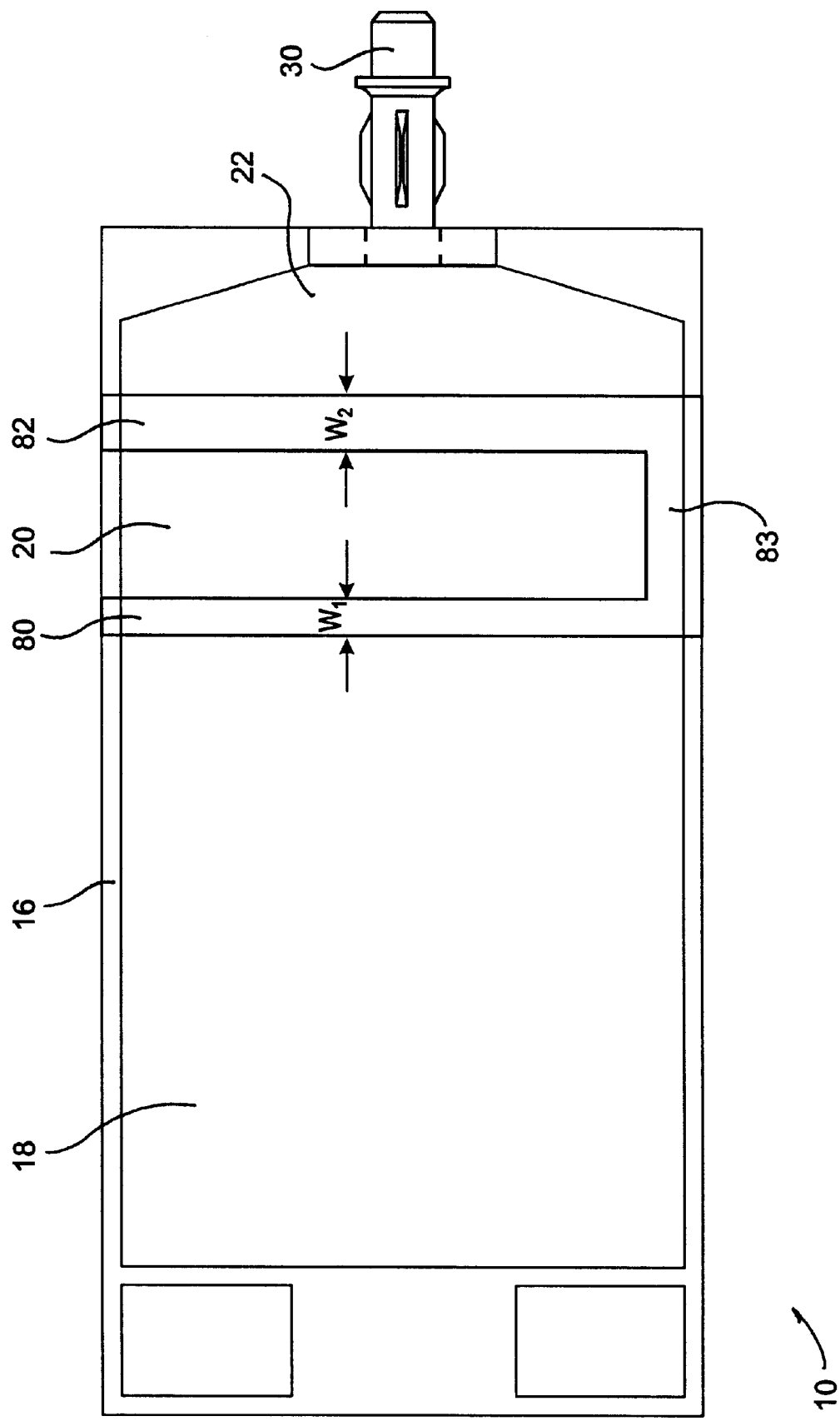
FIG. 9 is a semi-schematic front view of one exemplary embodiment of the container provided in accordance with the present invention showing a first arrangement of preferentially rupturable seals.

Turning now to FIG. 9, which depicts a semi-schematic front view of one exemplary embodiment of a container including preferentially rupturable seals for preventing the activation release of a liquid active drug from the medicament compartment to the outlet compartment without first mixing the liquid medicament with a diluent. The particular seal configuration is provided in order to resolve two conflicting performance requirements imposed on peelable, or frangible, seals used in connection with such an exemplary binary medical container. The first performance requirement for a peelable, or frangible, seal is that it provide a relatively strong resistance to the force generated by a product user to break or peel the seal, in order to avoid inadvertent rupture of the seal during normal handling. The second performance requirement is that the seal peel substantially completely apart during user activation, thus avoiding any subsequent restriction of the flow path between communicating chambers. It has been noted that with conventional peelable seals, there is a finite possibility that the seal, whether peelable or frangible, will incompletely peel apart along its entire length during activation. This may allow significant amounts of either liquid diluent, liquid medicament, or mixed medication to remain trapped against the unopened seal line sections. In addition, it has been noted that for conventional peelable seals, that when the force required for user activation increases, so too does the probability of incomplete seal opening. Operational use of a binary medical container requires that the peelable seals survive various impacts during the product's lifetime. However, significant impact events may occur during which the peelable seals are susceptible to rupture with subsequent product activation. In order to reduce the risk of unanticipated activation, an effective binary medical container should be constructed with peelable seals strong enough to resist most inadvertent impacts, yet completely yield to the pressures of intentional manipulation.

Accordingly, the selectively peelable seals, 80 and 82, depicted in FIG. 9 resolves the conflicting performance requirements by having different widths depending on which two compartments they are interposed between. As was described above in connection with FIGS. 1 and 2, and as shown in FIG. 9, the peelable seals 80 and 82 span the compartment horizontally, and have a length sufficient to connect between the permanent seals 16 on the sides of the container, thus dividing the container into compartments. The seals are formed with a generally rectilinear C-shaped heat seal die, whose long arms form the seals 80 and 82 between compartments, and which includes a base portion, generally indicated at 83, which extends from one end of the first seal 80 to a corresponding end of the second seal 82. The C-shaped heat seal die, and particularly the base portion 83, is so constructed to ensure that the area in which the peelable seals are formed extends over and covers the permanent peripheral seal 16. This is to promote complete peelable seal formation at the intersection (i.e., the corner) between the peelable seal and the permanent seal 16.

As shown in FIG. 9, the first peelable seal 80 is generally rectangular in shape and is formed so as to delineate, and separate, the diluent compartment 18 from the liquid medicament compartment 20. The width dimension ($W_1$) of the first preferentially peelable seal 80 is approximately ⅛ to ⅜ inches (3–10 mm), and preferably ⅛ inches (6 mm).

The second peelable seal 82 is formed in a region which delineates, and separates, the liquid medicament compartment 20 from the outlet compartment 22. Like the first preferentially peelable seal 80, the second peelable seal 82 is generally rectangular, but has a width ($W_2$) of approximately from 7 to 12 mm and preferentially about 10 mm (⅜ inches).

It will be understood that the larger width dimension ($W_2$) of the second seal 82 requires a great deal more energy to peel open than the first preferentially peelable seal 80. In addition, it can be seen from FIG. 9, that the area footprint of the liquid medicament compartment 20 is considerably smaller than the liquid footprint of the diluent compartment 18. Accordingly, the container is able to accommodate a substantially larger volume of liquid diluent than medicament. The implication of the larger diluent volume is that were the container to be manipulated, a larger force would be exerted by the diluent against the first peelable seal 80 than would be developed by the medicament against the second peelable seal 82. Since the first peelable seal 80 requires a lower activation energy than the second peelable seal 82, it will be understood that the first seal 80 will preferentially peel-open in preference to the second peelable seal 82.

Once the first peelable seal 80, between the diluent and medicament compartments, is peeled-open, liquid diluent and liquid medicament are allowed to mix, without the danger of a medicament bolus forming. Once the components are adequately mixed, there is now sufficient liquid volume that can be manipulated to cause a sufficient force against the second peelable seal 82 to thereby rupture that seal and allow the diluent/medicament liquid to enter the outlet compartment 22 for eventual dispensing.

The widths of the first and second peelable seals 80 and 82, in combination with the mass of liquid contained in the diluent and medicament compartments 18 and 20, respectively, cooperate to ensure that the first seal 80 between the diluent and medicament compartments is preferentially peeled-open before the seal 82 between the medicament and outlet compartments no matter how a manipulation force, or pressure, is applied to the container. Were the manipulation force or pressure applied to the medicament compartment, the first peelable seal 80, requiring a lower activation energy or force to open as opposed to the second seal 82, will preferentially rupture. The specific widths ($W_1$ and $W_2$) of the first and second peelable seals 80 and 82, will, of course, vary with the length of the seal (size of the container), the fluid mass contained in the medicament and diluent compartments, and the particular application to which the binary container is put, including the anticipated strength of any advertent impacts. However, specific seal widths may be suitably calculated, by one having skill in the art using common beam theory and suitably determining the desired opening pressure for each of the seals. In addition, in a manner to be described in greater detail below, each of the seals 80 and 82 of FIG. 9 exhibit a uniform resistance characteristic to manipulation pressure, such that once rupture is initiated, the seals peel-open completely along their length, to at least the orthogonality point of their intersection with the base portion 83, if a C-shaped seal head die is used.

Figure 10:
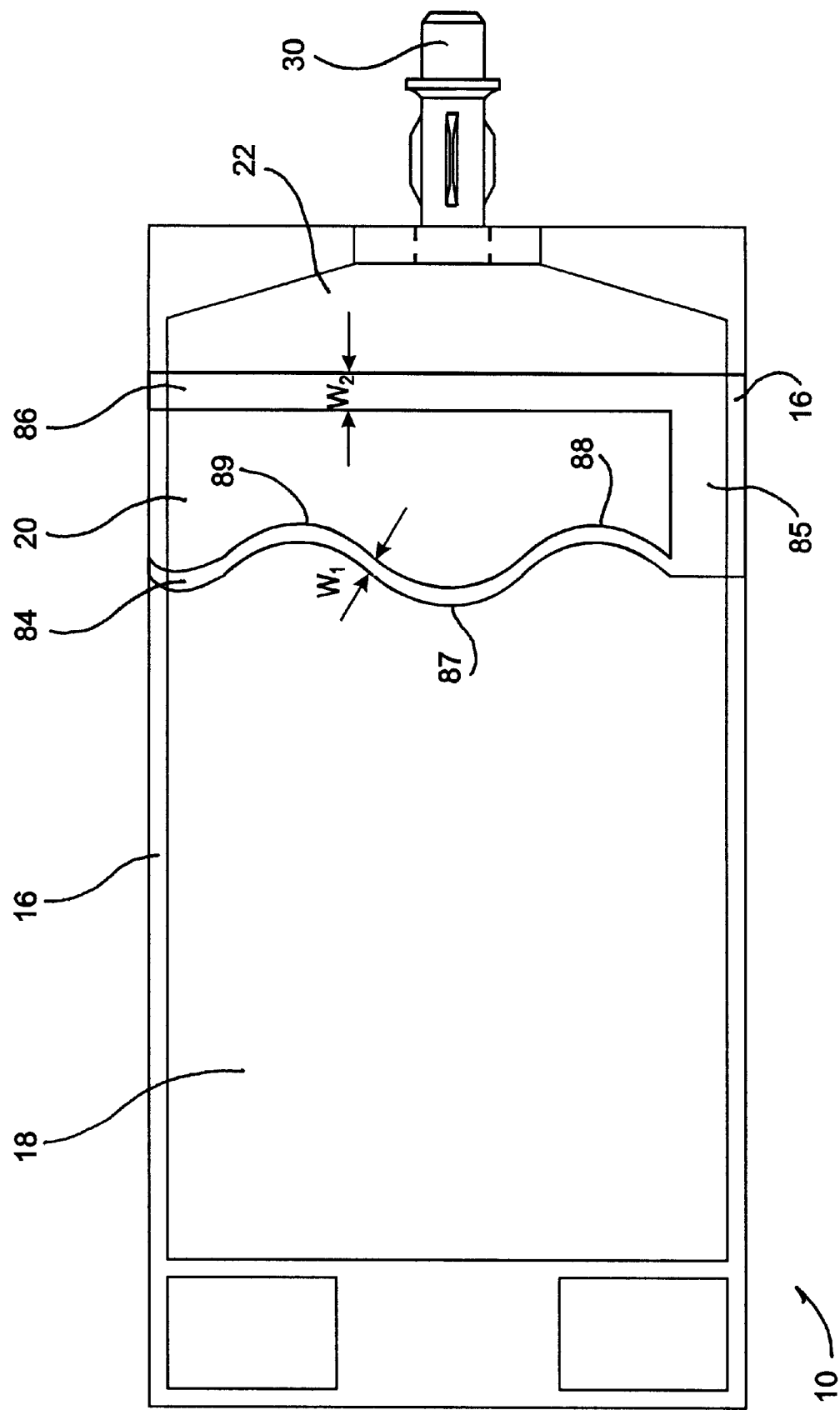
FIG. 10 is a semi-schematic front view of a container showing an additional embodiment of preferentially rupturable seals configured with an initiation point.

An additional embodiment of preferentially peelable seals, in accordance with the present invention, is depicted in semi-schematic schematic form in FIG. 10. As was the case with the embodiment of FIG. 9, the embodiment of FIG. 10 includes first and second peelable seals, 84 and 86, with the first peelable seal 84 configured to delineate and separate the medicament compartment 20 from the diluent compartment 18. The second peelable seal 86 is configured to delineate and separate the medicament compartment 20 from an outlet compartment 22. In addition, the first and second peelable seals 84 and 86 span the container and are configured to extend between the permanent seals 16 which define the outer bounds of the container. In a similar manner to the embodiment of FIG. 9, the seals are formed with a conformal heat seal die, preferably a single piece heat seal die, whose long arms form the seals 84 and 86 between compartments, and which includes a base section, generally indicated at 85, which extends from one end of the first seal 84 to a corresponding end of the second seal 86. The heat seal die, and particularly the base portion 85, is constructed to ensure that the area in which the peelable seals are formed extends over and covers the permanent peripheral seal 16, to either side of the container. Overlapping the peelable seal with the permanent seal promotes complete peelable seal formation at the intersection (i.e., the corner) between the peelable and permanent seal 16.

As depicted in FIG. 10, the second peelable seal 86 between the medicament compartment 20 and outlet compartment 22, is generally similar to the second peelable seal 82 depicted in FIG. 9, i.e., the second peelable seal 86 is generally rectangular in shape and is formed so as to delineate and separate the medicament compartment 20 from the outlet compartment 22. The width dimension ($W_2$) or alternatively the seal distance between the medicament compartment 20 and the outlet compartment 22, is approximately 3/16 to 5/16 inches (4 to 8 mm) and preferably 1/4 inches or 6 mm.

The first preferentially peelable seal 84 has a width dimension ($W_1$) or alternatively the seal distance between the diluent compartment 18 and medicament compartment 20, of about 1/16 to about 3/16 inches, and preferably about 1/8 inches or 3 mm.

As opposed to the embodiment of FIG. 9, the first preferentially peelable seal 84 of FIG. 10 does not have a conventional, rectangular shape. In accordance with practice of principles of the invention, the first preferentially peelable seal 84 is formed with a sinusoidal, or snake-like, shape such that at least one stress riser, identified at 87, protrudes into the diluent chamber 18 with its excursion point oriented in the direction of an anticipated pressure front caused by manipulating the diluent chamber.

Although formed in a curvalinear fashion, the first preferentially peelable seal 84 is nevertheless provided with a uniform seal width, $W_1$, along its entire length. Notwithstanding that the seal is formed with at least a stress riser 87, which functions in a manner to be described in greater detail below, the fact of its narrower width than the second preferentially peelable seal 86, means that the first seal 84 will preferentially peel-open in the event of an unanticipated pressure front developed in the medicament compartment 20 by a, for example, impact vent.

Accordingly, at least to that extent, the first peelable seal 84 will preferentially peel-open with respect to the second peelable seal 86 in response to a pressure event, such that liquid diluent will always mix with liquid medicament before the container's components are allowed to enter the outlet compartment 22.

In addition to the stress riser 87 having an inflection point oriented in the direction of the diluent compartment, it will be seen that the first selectively peelable seal 84 of FIG. 10 includes two additional stress risers 88 and 89 with inflection points oriented towards the medicament compartment 20. In a manner well understood by those having skill in the art, each of the stress risers inflection points defines a peel initiation point, at which the peelable seal begins to peel-open in response to a pressure event in the compartment towards which the initiation point is oriented. In operation, the convex leading edge of an inflection point, or initiation point, presents a compound resistance characteristic to the hydraulic pressure of either diluent or liquid medicament, when either of these compartments is squeezed. A mathematical finite element analysis of a developing pressure front against a non-linear barrier, such as the curved first preferentially peelable seal 84 of FIG. 10, reveals that forces due to $\Delta P$ are concentrated in the region of maximum inflection of the stress riser, where the inflection point extends in the direction of the pressure front. This concentrated force due to $\Delta P$ will tend to preferentially initiate seal rupture at the inflection point. Moreover, such a seal will tend to initiate the peel process at a lower nominal manipulation pressure than if the seal were constructed to be uniformly straight across.

Thus, notwithstanding its smaller width dimension, the first preferentially peelable seal 84 will more readily rupture if pressure is applied to the liquid medicament in the medicament compartment 20 than the second peelable seal 86 between the medicament and outlet compartments. As can be seen in FIG. 10, the first seal 84 includes two initiation points, at 88 and 89, which are directed towards the medicament compartment and which will promote preferential seal-opening in response to a pressure event generated therein. These two initiation points, 88 and 89, in combination with the initiation point 87, oriented towards the diluent compartment, ensure that first peelable seal 84 preferentially opens in response to hydraulic pressure generated anywhere within the container. Thus, liquid medicament may not peel open the second peelable seal 86 and enter the outlet compartment without first having mixed with diluent by either peeling open the first seal 84 or by having the diluent peel open the first seal.

Although the first preferentially peelable seal 84 has been described as having a sinusoidal, or snake-like, construction, such that the initiation points 87, 88 and 89 are defined by convex curvatures, it is not necessary that the shape of the first preferentially peelable seal 84 be defined with any particular regularity. Indeed, application of mathematical finite element analysis reveals that peel initiation is enhanced as the inflection point becomes sharper. Finite element analysis indicates that as the inflection point tapers to an actual point, as would be the case in a saw-tooth configuration, peel initiation is maximized. In such a situation, however, the force required to initiate peel will likely be so low as to cause the first seal 84 to inadvertently peel-open under the ordinary stresses of day-to-day container handling. In contrast, were the radius of curvature of the various inflection points to be made unduly large, the configuration of the first seal 84 would more resemble a conventional linear seal which would substantially forego the benefits of an enhanced initiation point. The specific shape, radius of curvature, and depth of cord of the first peelable seal 84 is, therefore, a matter of design choice and may vary with the length of the seal and the particular application to which the binary container is put, including the anticipated strength of any inadvertent impacts. Specific seal shapes may be suitably calculated, by one having skill in the art, using beam theory and suitably determining the desired opening pressure for the seal. In the exemplary embodiment of FIG. 10, the first peelable seal 84 is generally sinusoidal in shape and preferably includes three inflection points with a radius of curvature of from approximately ⅛ inches to approximately ⅜ inches and preferrably about ¼ inches.

Figure 11:
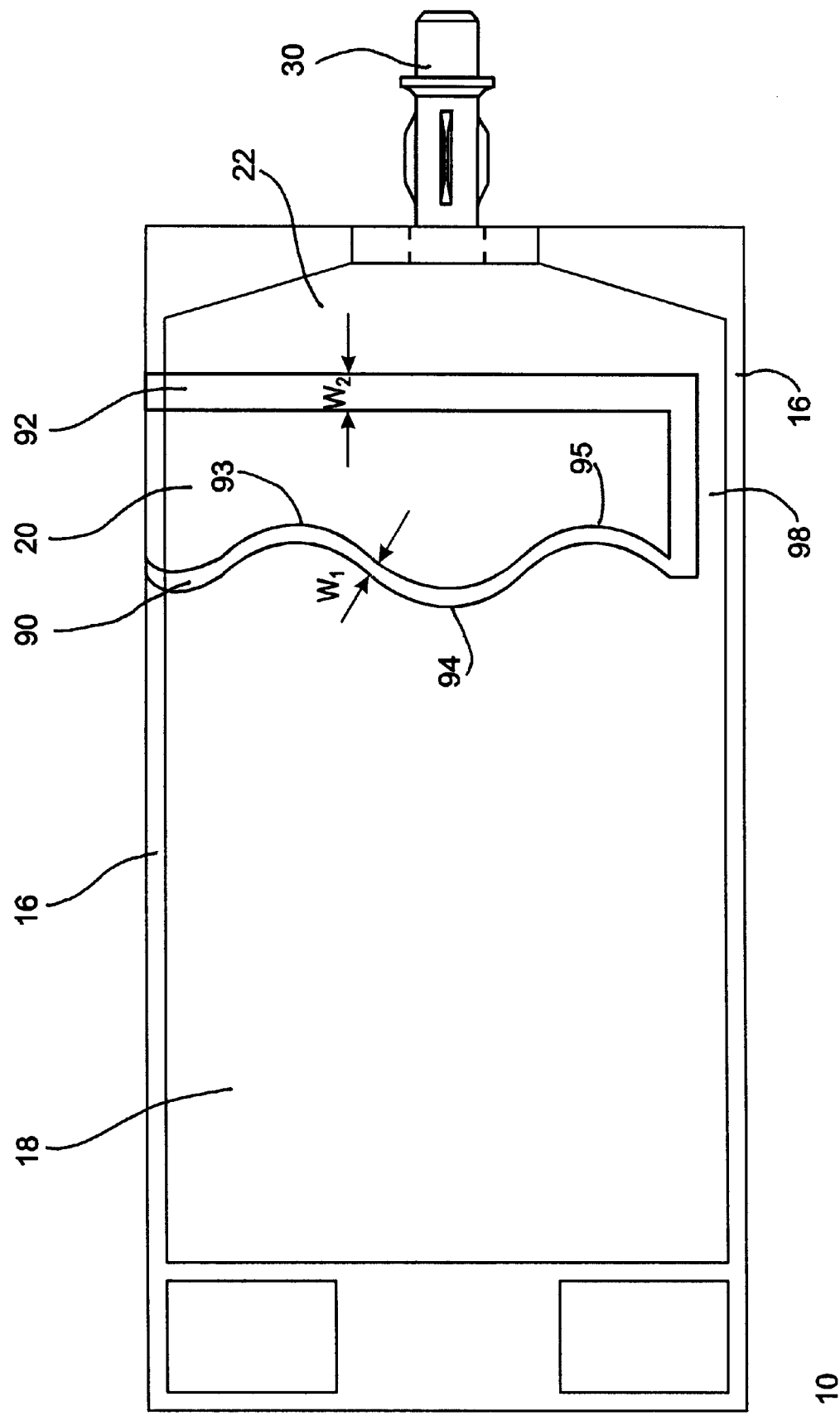
FIG. 11 is a semi-schematic front view of a container showing a further embodiment of preferentially rupturable seals having particular initiation points and a pressure equalization flow path.

Turning now to FIG. 11, there is illustrated in semi-schematic form, a third exemplary embodiment of a medical container configured for storage, mixing and delivery of binary components comprising a liquid medicament and liquid diluent. The container comprises first and second selectively peelable seals 90 and 92 which are arranged and configured to separate the liquid medicament compartment 20 from the diluent compartment 18. As can be seen from the illustrated embodiment of FIG. 11, the first and second peelable seals 90 and 92 are generally similar in arrangement and construction to the selectively peelable seals 84 and 86 of the embodiment illustrated in FIG. 10. In particular, the first selectively peelable seal 90 is constructed with a sinusoidal or snake-like shape comprising three inflection points, 93, 94 and 95. The first and third inflection points, 93 and 95, are configured such that their convex faces are oriented in the direction of the medicament compartment 20, while the second inflection point 94 is configured with its convex face oriented in the direction of the diluent compartment 18. While curved, the width of the first selectively peelable seal 90 ($W_1$) is uniform along the length of the seal, at least when the width $W_1$ is evaluated tangentially to the seal's curvature. As was the case with the first two embodiments, described above, the width dimension of the first preferentially peelable seal 90 may vary from about 1/16 to about 3/16 inches (2–5 mm) but is preferably about ⅛ inches (3 mm) in width.

The second selectively peelable seal 92 is generally rectangular in shape and has a width dimension $W_2$ of from about 3/16 to about 5/16 inches (4–8 mm) but is preferably about ¼ inches (6 mm) in width. Where the first selectively peelable seal 90 forms one of the four sides of the liquid medicament compartment 20, the second selectively peelable seal 92 forms a second side, opposing the side formed by the first seal 90. A third side of the medicament compartment 20 is defined by the container's peripheral permanent seal 16. When the selectively peelable seals are formed, a portion of the seal length for both the first and second seals 90 and 92 extend towards this third end defined by the permanent seal 16 and overlaps the permanent seal in order to ensure integrity of the peelable seals at their intersection with the permanent seal.

The remaining, fourth, side of the medicament compartment 20 is defined by a peelable seal 96 which extends from the first peelable seal 90 to the second peelable seal 92, but which is spaced-away from the container's permanent peripheral seal 16 so as to leave a connecting, pressure equalization, channel 98, configured to allow communication between the diluent compartment 18 and an outlet area 22 disposed between the medicament compartment 20 and the outlet port 30.

Because the pressure equalization channel 98 allows fluid communication between the diluent compartment 18 and the outlet area 22, it will be understood that the outlet area 22 is no longer a compartment, but may be thought of as an extension to the diluent compartment 18. Likewise, it is no longer proper to refer to the area identified as 18 in FIG. 11 as a diluent compartment, since the compartment per se comprises both the region identified as 18 and the outlet area 22. However, to maintain consistency between the various embodiments of the invention, the area identified as 18 in FIG. 11 will be referred to as the diluent compartment, while the area identified as 22 in FIG. 11 will be referred to as the outlet area.

In operation, the container of the illustrated embodiment of FIG. 11 functions in a generally similar manner as the embodiment described in connection with FIG. 10. The first selectively peelable seal 90 is narrower than the second selectively peelable seal 92, such that $W_1 < W_2$. Accordingly, any pressure events generated in the medicament compartment 20 will peel-open the first seal 90 in preference to the second seal 92. In addition, the first selectively peelable seal 90 is shaped to provide stress risers at the previously noted inflection points 93, 94 and 95. As was the case with the embodiment of FIG. 10, the stress risers function to define preferential peel initiation points at their maximum points of excursion into the diluent and medicament compartments. Pressure events generated in either the diluent or medicament compartments will preferentially initiate seal rupture at these initiation points and for this reason, and because of its narrower width, the first preferentially peelable seal 90 will rupture in preference to the second seal 92 in response to any type of pressure event.

Integrity of the second peelable seal 92 is further maintained by equalizing fluid pressure on the seal through the pressure equalization channel 98 connecting the diluent compartment 18 with the outlet area 22. The pressure equalization channel 98 keeps $\Delta P$ equalized between the diluent compartment and the outlet area such that no matter what the status of either seal 90 or 92, liquid medicament will be mixed with diluent before any fluid can be dispensed from the container. The utility of this particular feature will become evident by returning momentarily to the embodiment illustrated in FIG. 9. Notwithstanding the preferential nature of the first peelable seal 80 of FIG. 9, it is nevertheless possible to have a liquid medicament bolus form in the outlet compartment 22 just prior to the containers being used. If a sufficient force were exerted on the diluent compartment 18 the resulting pressure front would rupture the first preferential peelable seal 80 and be transmitted by the liquid medicament to the second preferential peelable seal 82. A sufficiently large force (causing a sufficiently large pressure front) would very quickly rupture the two seals in succession without there being sufficient time for the diluent and medicament to mix. The diluent would force the liquid medicament ahead of it into the outlet compartment 22 as a bolus. Accessing this bolus with an IV set and dispensing the bolus to a patient would be extremely disadvantageous.

Returning now to the illustrated embodiment of FIG. 11, this possibility is substantially eliminated by having the outlet area 22 in fluid communication with the diluent compartment 18 by the pressure equalization channel 98.

Figure 12:
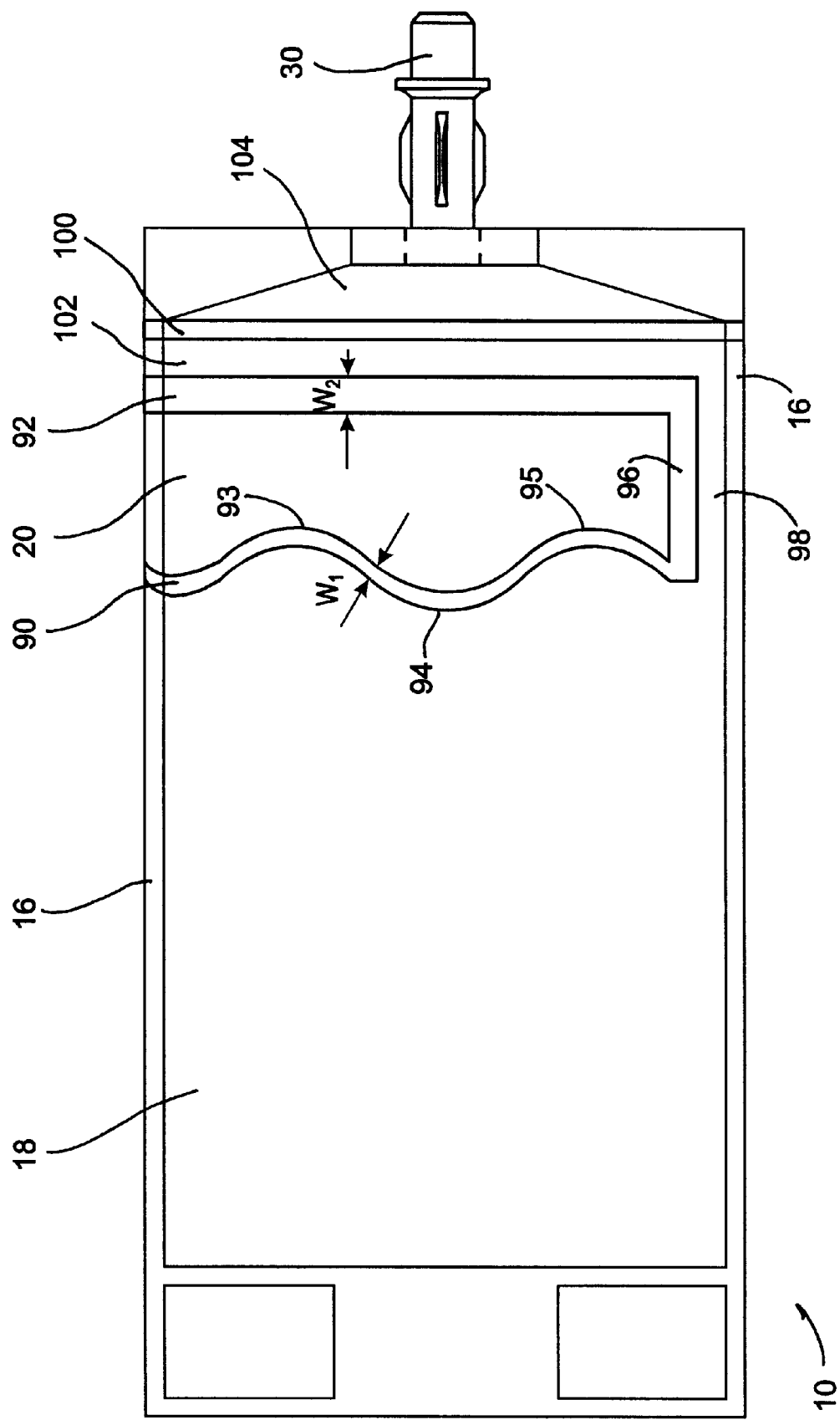
FIG. 12 is a semi-schematic front view of a container in accordance with the invention showing yet a further embodiment of preferentially rupturable seals in combination with a safety seal for preventing activation release of a liquid drug bolus.

An additional embodiment of a container and preferentially peelable seals provided in accordance with practice of principles of the invention is illustrated in semi-schematic form in FIG. 12. The container embodiment illustrated in FIG. 12 comprises essentially the same preferentially peelable seal construction and arrangement as the embodiment of FIG. 11, but comprises an additional peelable seal, a safety seal, disposed between the preferentially peelable seals and the outlet port 30. Because of the similarity in construction and arrangement of the preferentially peelable seals between the embodiment of FIG. 12 and that of FIG. 11, the preferentially peelable seals including initiation points, and the like, are identified with the same reference numerals. However, the outlet area (22 of FIG. 11) is now bisected by a safety seal 100 which is generally rectangular in shape and spans the container, overlapping the permanent peripheral seal 16 on both sides. The safety seal 100 subdivides the outlet area (22 of FIG. 11) into a pressure chamber 102 disposed between the safety seal 100 and the second preferential peelable seal 92, and an outlet chamber 104, disposed between the safety seal 100 and the outlet port 30.

In operation, the container embodiment of FIG. 12 functions much as the embodiment depicted in FIG. 11, but the safety seal 100 provides an additional degree of insurance against activation release of an active liquid medicament from the medicament compartment 20 to the outlet compartment 104. As was the case with the embodiment of FIG. 11, the pressure chamber 102 in combination with the pressure equalization channel 98 and diluent compartment 18 functions to maintain ΔP equalized between the pressure chamber and the diluent compartment, such that the second preferentially peelable seal 92 is unable to be ruptured unless and until the first preferentially peelable seal 90 is peeled-open and liquid medicament is allowed to mix with diluent. The pressure chamber 102 ensures ΔP equalization, but the volume of the chamber is insufficiently large to develop a rupture force strong enough to peel-open the second peelable seal 92. Once the liquid diluent has ruptured the first preferentially peelable seal 90, diluent and medicament are mixed and a sufficient force may be generated by their combined volumes to next rupture the second preferentially peelable seal 92 and thence the safety seal 100.

Accordingly, a binary component medical container in accordance with the present invention is seen as being suitable for combined storage and administration of binary liquid components without the deficiencies commonly associated with conventional containers. Various configurations of selectively peelable seals function to delineate and define diluent and medicament compartments and are further adapted to ensure that liquid medicament and diluents are mixed before the combined medication can be administered to a patient. The selectively peelable seals of such containers represent a significant improvement in binary component administration safety, as well as being easily and cost efficiently manufactured.

Seal Formation

Without being bound by theory, it is thought that the peelability of the seals is attained by limiting the time, pressure and temperature to that necessary to fuse the interface between inner layers of the front and rear sheets of the container, which have a lower melting temperature than the intermediate and outer layers of the rear sheet. The depth of the structural alteration in the inner layers of the fusion zone is limited, thereby imparting the peelable character to the seal while providing sufficient strength to prevent breakage during normal handling of the container. Preferably, the activation force for the container of the present invention is tightly controlled to provide container integrity under extreme handling conditions, yet be easy to activate for all users. The activation effort or force is characterized by a burst pressure which, necessarily, will vary according to the shape of each seal, its Width W, or its function (i.e., first preferentially peelable seal, second preferentially peelable seal, or safety seal) but is preferably uniform with respect to a particular seal to approximately±1 lbs. pounds per square inch (psi).

In order to achieve such uniformity in the burst pressure, it has been determined that the critical parameter which must be controlled is temperature. Uniform burst pressure response is achievable by controlling the seal temperature to within±2° F. Commercially available production heat seal apparatus not able to control the variability in heat seal temperature to this desired range. However, the seal time is able to be controlled very precisely. Accordingly, time is chosen as the control parameter and adjusted to compensate for the variation in heat seal temperature. Time and pressure of the seal head are monitored to ensure that they are in within acceptable ranges and the heat seal time is adjusted accordingly. While the contact pressure is preferably in the range of from about 230 psi to about 340 psi, it will be recognized by one having skill in the art that the lower figure in the range (about 230 psi) is provided for convenience in setting the parameters of a production heat seal machine. So long as the pressure exerted by the heat seal bars on the container material is sufficient to force the material seal layers into contact over the surface area of the desired seal, a peelable seal will be formed given an appropriate temperature and time. Indeed, it has been experimentally determined that variations in heat seal temperature and time beyond those contemplated by the present invention, result in seals that not only fail to exhibit the desired uniform resistance characteristic, but also fail to rupture completely along the length of the seal. Incomplete seal rupture often results in residual diluent or medicament, for example, remaining trapped in 90° corners where the peelable seals contact the permanent peripheral seals of the container. Accordingly, the diluent/medicament mixture ratio may not be as intended, and drug delivery may be at a higher concentration than desired.

Examples of specific time, temperature and pressure settings which will form peelable seals, in the 80:20 film of the illustrated embodiments, having a burst pressure uniformity of about±1 psi include: pressure=235 psi, temperature=257° F., and time=1.9 seconds; and pressure=235 psi, temperature=260° F., time=1.75 seconds. Higher temperatures and associated pressures and times are used to provide the peripheral permanent heat seals and the outlet port seal, which produce structure altering effects in a greater proportion to, or depth of, the sealing layers. Such seals may be formed by heat sealing at a temperature of 290° F. and a pressure of up to 200 psi for about 2 seconds. Those skilled in the art will recognize that various techniques for forming both permanent and peelable seals may be used in the construction of the container of the present invention. In particular, it will be evident that controlling seal temperature to a greater degree (to within about±2° F.) will also allow formation of peelable seals having uniform burst pressure. In addition, time is chosen as the control parameter for seal formation because it is able to be precisely controlled. Precision control of temperature, pressure, or both would give the same result.

The preferentially peelable seals comprising the container embodiments illustrated in FIGS. 9–12 (in optionally the safety seal 100 of FIG. 12) are created using a modular heat seal station configured with a heat seal head having a double seal bar configuration in which one end of the double bars are connected together by a transverse seal bar so as to describe a generally elongated U shape. The elongated U shape will, necessarily, follow the footprint of the seals as the seals are depicted in FIGS. 9–12. The modular heat seal station is incorporated into a modular container fabrication apparatus such as described in co-pending application Ser. No. 08/837,927 filed Apr. 11, 1997, which is commonly owned by the Assignee of the present invention and the entire disclosure of which is expressly incorporated herein by reference. Due to its modular nature, the conventional peelable seal formation station is merely removed from the container fabrication apparatus and substituted with a preferentially peelable seal formation station which comprises a heat seal head shaped and configured to provide preferentially peelable seals having footprints in accordance with any one of the embodiments illustrated in FIGS. 9–12. The modularity of the container fabrication apparatus and, particularly, the modular nature of the heat seal stations, allows various embodiments of containers to be manufacture with the same apparatus. Containers may be specially configured with specific selectively peelable seals depending on the exact combination of liquid medicament and diluent desired to be stored and administered thereby. Accordingly, the modular container manufacturing apparatus in accordance with the invention is seen as being suitable for manufacturing a wide variety of medical containers having a wide variety of sizes and a wide variety of seal configurations. All of the containers so manufactured will be seen to be suitable for not only liquid/liquid binary components, but also for binary components comprising liquid diluents and powdered medicaments, if such is desired.

Container with Reduced Head Space

Figure 13:
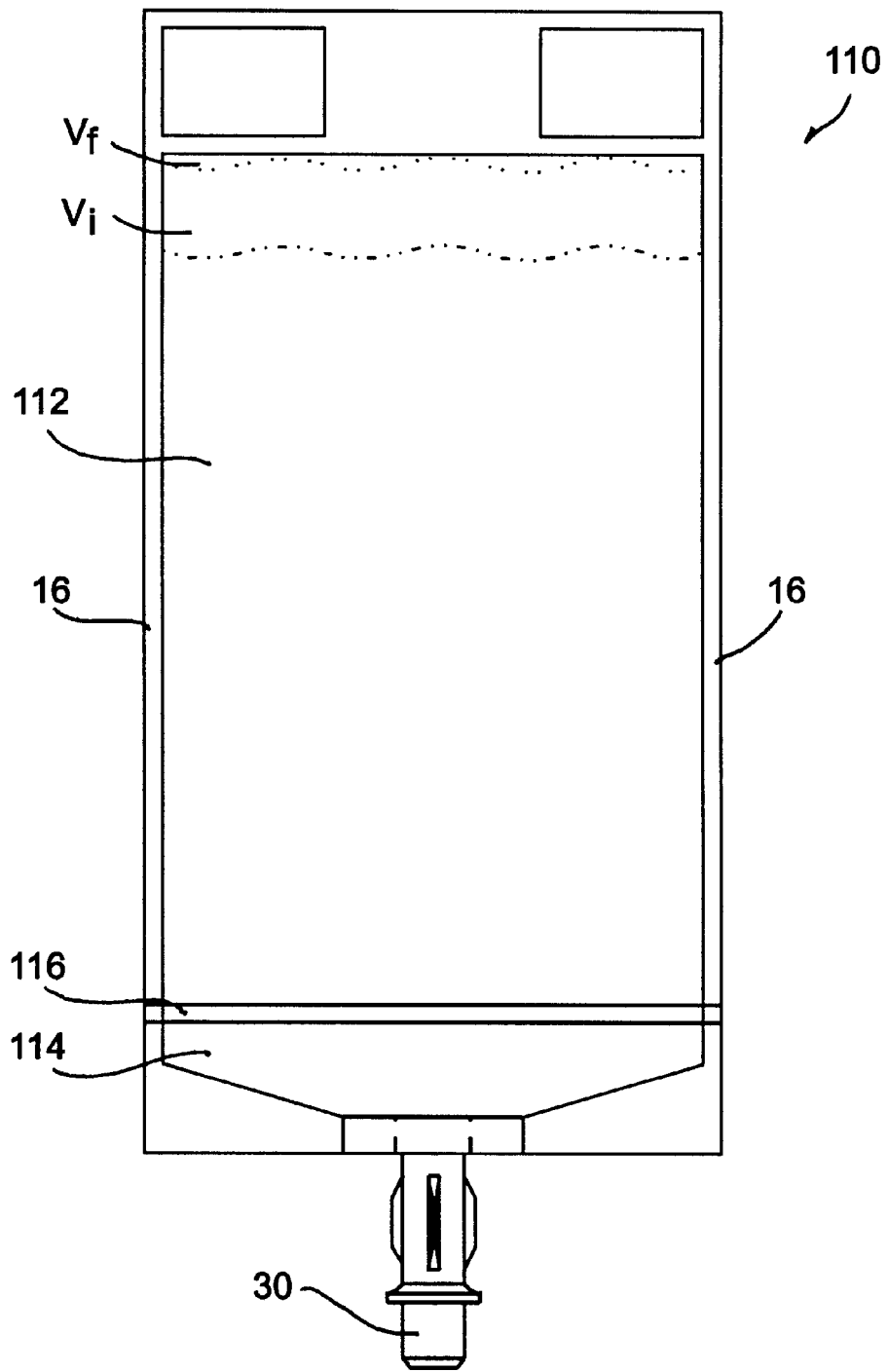
FIG. 13. is a semi-schematic front view of a container in accordance with the invention filled with a liquid and including a substantially reduced head space.

An additional embodiment of a medical container suitable for combined storage and administration of emulsions, liposomes, and the like, which are particularly susceptible to sloshing or turbulence, is illustrated in FIG. 13. While the container, generally indicated at 110, is superficially similar to previously described embodiments, it will be noted that the container comprises a single compartment 112 adapted to contain an active ingredient, preferably a liquid. The component compartment 112 is separated from an empty outlet compartment 114 by a generally straight, rectangular peelable seal 116 which spans the container and overlaps a permanent peripheral seal 16 which binds together the front and rear sheets comprising the container. An outlet port 30 is provided at one end of the container and is in communication with the outlet compartment 114. In operation, the container 112 is manipulated by squeezing which causes fluid pressure developed in the component compartment 112 to rupture the peelable seal 116, allowing the liquid component to be accessible through the outlet port 30 for administration.

For reasons that will be described in greater detail below, the outlet compartment 114 is preferably configured as an air chamber, such that it contains a minimal quantity of filtered, sterile air. The component compartment 112 suitably comprises a volume suitably comprises a volume of liquid which has been introduced into the compartment in such a manner that there is substantially no head space (residual air or gas) incorporated into the component compartment 112 with the liquid.

Such a container 110 is suitably manufactured from front and rear sheets comprising the above-described single layer thermoplastic films and laminates thereof. The front and rear sheets are combined together from film webs in a modular container fabrication apparatus such as disclosed in co-pending application Ser. No. 08/837,927 filed Apr. 11, 1997, commonly owned by the Assignee of the present invention, the entire disclosure of which is expressly incorporated herein by reference. Front and rear sheet film webs are combined to form the general outlines of the container 110 as illustrated in FIG. 13. In addition, the fabricated container includes a sacrificial strip extending from and disposed to one side of the container which also includes sacrificial filling ports and filling channels which are in communication with the interior of the component compartment 112. As is described in the noted reference, the sacrificial strip and sacrificial ports are useful during the container's filling process, and are cut-away after filling is complete and the container is ready for shipment to the consumer.

After the container is brought to the stage of fabrication where it is ready for filling with a liquid component, the container is initially sterilized by exposure to UV radiation or an electron beam (E-beam). After the sterilization procedure is completed, the sterilized medical containers are transported to an aseptic filling facility and the containers are aseptically filled in accordance with practice of the invention as is described with reference to an exemplary process flow-chart depicted in FIG. 14.

Container filling will take advantage of manufacturing technology developed in connection with integrated circuit fabrication that is becoming more common in the medical industry. This technology generally involves a move away from conventional container filling in class 100 aseptic environments, to container filling within an "isolator" unit in which the environment is sterile. The main distinction between class 100 aseptic environments and "isolators" is the separation of the worker from the environment. An isolator is in essence, a "mini environment" which encloses the immediate machinery and container filling operation within a controlled space. The worker is separated from this space and interferes with the materials therein through glove ports and/or "half suits". By separating the worker from the environment, it is possible to create and maintain a small, sterile environment, since the worker is typically the major source of biological contaminants in prior procedures.

Aseptic filling is performed in accordance with modular aseptic filling apparatus and methods disclosed in co-pending application Ser. No. 08/837,927 filed Apr. 11, 1997 commonly owned by the Assignee of the present invention, the entire disclosure of which is expressly incorporated herein by reference. As noted in the cited reference, containers are introduced and moved through a filling isolator by a transport mechanism which engages contact flanges provided on the container's sacrificial ports for such purpose. The transport mechanism indexes and moves the container through the various process stations comprising the process, such as an initial weight determination, de-blocking, aseptic filling, final weight determination, and the like.

Figure 14:
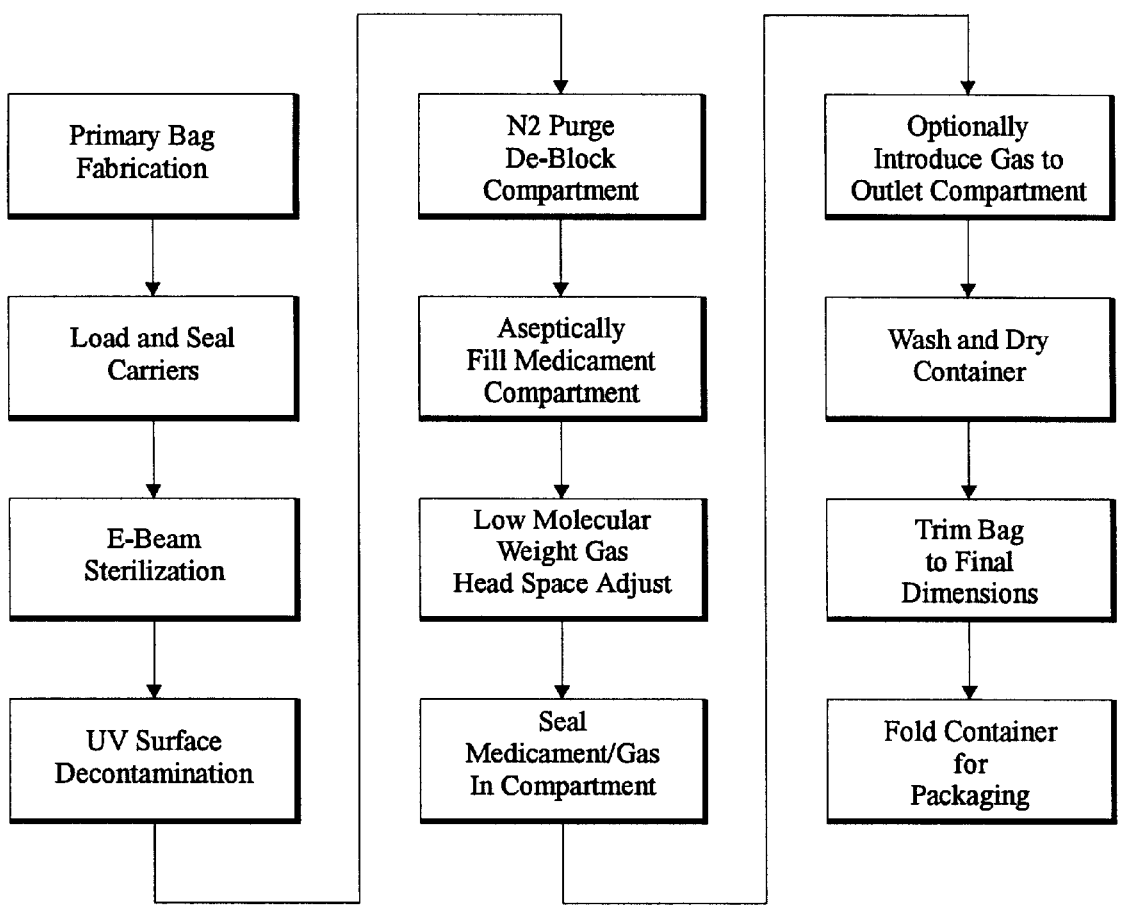
FIG. 14 is an exemplary flow chart of an aseptic filling and head space reduction process for one embodiment of the container in accordance with the present invention.

Specifically, and in accordance with the exemplary process flow diagram of FIG. 14, the container 110 is introduced into a liquid fill isolator and placed on a continuous-loop transport band which indexes the container through the steps of the liquid filling process. Each container is indexed to a fill station at which a robotic arm moves through an arc and grasps and removes the safety cap from the compartment's sacrificial port to make the port and, thus, the component compartment 112 accessible to a liquid. The component compartment 112 is next de-blocked with a jet of 0.2 micron filtered nitrogen or air to prepare the component compartment 112 for receiving liquid. De-blocking the campartment 112 serves to separate the front and back sheets from one another, forming the compartment into a pouch-like configuration into which a carefully controlled dose of liquid can be dispensed. The compartment's sacrificial port is then positioned beneath the dispensing nozzle of a liquid filling machine. A pre-determined amount of liquid, such as a liposome solution, an active emulsion, or the like, is dispensed, in carefully controlled doses, into the container through the sacrificial port. It will be understood by those having skill in the art that liquid may be introduced to the container in a single dispensing step. Alternatively, a dual dispensing step or multiple dispensing step procedure may be used, where the container is indexed past two or more sequentially positioned dispensing nozzles. A multiple dispensing step procedure is particularly suitable for filling the container with liquids which are extremely susceptible to turbulence and which must be provided in carefully controlled dosages.

Following the dispensing step, the container is indexed to a heat seal station where the component compartment head space is first adjusted with a jet of 0.2 micron filtered atomic helium (He). The heat seal station comprises a heat seal platen opposed to a backing plate which are closed over the container so as to seal off the communication channel between the sacrificial port(s) and the component compartment 112. In effect, the heat seal continues the permanent peripheral seal such that the entire periphery of the container is now closed-off.

The filled container now exits the isolator and is rinsed and dried to remove any residual liquid from its exterior surface and is trimmed to its final dimensions by removing the oversized sacrificial portion of the container which includes the sacrificial ports. Container fabrication and filling is now complete.

It will be understood by those having skill in the art that the head space adjust step at the end of the filling process introduces a particular volume of helium gas into the component compartment of the container and does, indeed, initially define a head space within the container. Returning now to FIG. 13, the initial head space defined by the jet of helium is identified as $V_i$ and represents the initial head space volume provided in the component compartment.

However, it will be immediately recognized that the thermoplastic films used to construct the container 110 have the properties of membranes and are, thus, subject to the physical laws of relative permeability. For example, the 80:20 film comprising the front sheet of the container 110 has been described above as having a particular permeability with respect to oxygen ($O_2$). In addition to recognizing the container films as permeable membranes, it is also important to recognize that concentration driven diffusion across the membrane, in accordance with Ficks Law, also applies to the system under consideration. When helium is initially introduced into the container, the volume of helium $V_i$ is present at nominally one atmosphere. However, this volume comprises pure atomic helium which is necessarily present at a much greater concentration than the concentration of helium in ordinary air. Since diffusion of a particular material across a membrane is proportional to the concentration gradient of that material across the membrane, helium will preferentially diffuse through (permeate) the material comprising the container and pass from the head space volume $V_i$ into the atmosphere. Likewise, air (80% $N_2$ and 20% $O_2$) is subject to the same concentration gradient diffusion from the atmosphere to the container's head space, but the exchange rate of air for helium is considerably less than unity. The equilibrium exchange between air and helium is determined by the ratio of the permeability of the container material to helium to the permeability of the container material to air. Since helium is an atomic gas, i.e., comprised of helium atoms rather than helium molecules, its material cross-section is considerably smaller than that of the components of air making it easier for helium to move between the component molecules comprising the container film. For example, the atomic radius of a helium atom is smaller than 1 angstrom (Å) while the atomic radius of an oxygen or nitrogen molecule is from about 3 to about 4 angstroms (Å). It would, therefore, be expected absent all other considerations for helium to exhibit a diffusion rate about 4 times that of air, such that as helium permeates through the container material and is replaced by air, the final head space volume, at equilibrium, is at least only ¼ that of the initial head space volume. This is indicated in the embodiment of FIG. 14 as the area identified as $V_f$.

Relative permeabilities of helium and air are, of course, susceptible to various other factors than just their differences in atomic and molecular cross-section. For example, the arrangement and configuration of the molecular chains comprising the container film will have an impact on the relative diffusivities of the two gasses. It is evident that a relatively dense material may easily pass helium, but be relatively impermeable to a larger molecule such as air. In that case, concentration driven diffusion would essentially force all of the helium out of the component compartment, thereby substantially eliminating the head space altogether. Understanding the principles of concentration gradient diffusion and membrane permeability suggests that perhaps a sequential technique may be used in order to more precisely define the final volume $V_f$ of the component compartment head space. For example, the head space could be initially created with helium and the container could then be placed in a chamber filled with pure nitrogen ($N_2$) A volume of nitrogen would be substituted for the volume of helium by operation of Ficks Law as described above, but the final volume would necessarily be considerably smaller than the initial volume of helium, and quite possibly practically nil. The container could then be removed from the nitrogen ambient and introduced into ordinary room atmosphere where concentration gradient driven diffusion would cause some of the nitrogen comprising the final head space volume to permeate the container's material into the air in competition with air's diffusing across the membrane into the head space volume. Because air comprises 80% nitrogen, the concentration gradient across the container film (the membrane) is relatively small and equilibrium rate exchange considerations would mean that the head space volume change would be di minimus.

As liquid is dispensed from such a container, it is often desirable to evaluate the progress of an infusion by comparing the container's liquid level to graduation marks provided on the container for such purpose. For this to happen, there must be a meniscus present in the liquid. It is for this reason that the outlet chamber 114 of the container 110 of FIG. 14 is filled with 0.2 micron filtered air. The air in the outlet compartment defines a meniscus on the surface of the liquid once the container is manipulated and the peelable seal 116 is ruptured. Thus, the liquid in the component compartment 112 is protected from sloshing and/or turbulence by eliminating the compartment's head space, but a suitable meniscus can be developed in the liquid to allow progression of the infusion to be visually evaluated.

Those skilled in the art will recognize that the primary discussion of embodiments comprising liquid diluents and medicaments in combination with the various embodiments of preferentially peelable seals do not limit the scope of the invention. Use of powdered medicaments in the intermediate compartment or a plurality of compartments for powdered and liquid medicaments, to be mixed with various diluents, may be employed using the present invention. Moreover, the specific shapes and configurations of the preferentially peelable seals described in connection with the various illustrated embodiments may be changed to suit specific applications of the container. The thickness of the seals and their degree of overlap with the container's permanent peripheral seal may all be adjusted to conform with particular manufacturing practices, while the sharpness of the various initiation points may be adjusted to suit the rupture characteristics of a particular peelable seal design.

Moreover, head space elimination need not depend exclusively on the use of helium gas to form an initial sacrificial head space volume. Any other gas with a preferential permeability and/or diffusion rate through the container material with respect to air is suitable for use in initially filling the container. Alternative gasses might include hydrogen or neon or even argon, so long as the initial head space volume is filled with a gas that will have a strong concentration driven diffusivity and a favorable permeation rate across the film material with respect to air.

The above descriptions of exemplary embodiments of flexible, sterile containers are for illustrative purposes. Because of variations which will be apparent to those skilled in the art, the present invention is not intended to be limited to the particular embodiments described above. Such variations and other modifications and alterations are included within the scope and intent of the invention as described in the following claims.

We claim:

1. A flexible container for combined storage and administration of medicaments and diluents for IV solutions, the container comprising:

a flexible rear sheet;

a flexible front sheet sealed to the rear sheet along a common peripheral edge;

a first preferentially peelable seal separably joining the front and rear sheets to delineate and define a compartment containing a diluent;

a second preferentially peelable seal separably joining the front and rear sheets to delineate and define a compartment containing a medicament; and wherein the first and second preferentially peelable seals are rupturable in response to hydraulic pressure developed by manipulating the container, each seal configured with a respective different rupture characteristic, such that the first preferentially peelable seal ruptures before the second preferentially peelable seal regardless of whether the hydraulic pressure is developed in the diluent compartment or the medicament compartment.

2. A flexible container as defined in claim 1, wherein the first and second preferentially peelable seals are substantially rectangular in shape and extend between two sides of the common peripheral edge of the container.

3. A flexible container as defined in claim 1, wherein the first and second preferentially peelable seals are each characterized by a seal width, and wherein the seal width of the first preferentially peelable seal is less than that of the second preferentially peelable seal.

4. A flexible container as defined in claim 3, wherein the second preferentially peelable seal extends between two sides of the common peripheral edge to form thereby an outlet compartment such that the medicament compartment is intermediate the outlet compartment and the diluent compartment.

5. A flexible container as defined in claim 4, wherein the medicament is a liquid.

6. A flexible container as defined in claim 1, wherein the first preferentially peelable seal spans the two sides of the common peripheral edge and is formed as a compound curve, and wherein the second preferentially peelable seal spans the two sides of the common peripheral edge and is substantially rectangular in shape.

7. A flexible container as defined in claim 6, wherein the first and second preferentially peelable seals are each characterized by a width dimension, and wherein the width dimension of the first preferentially peelable seal is substantially smaller than the width dimension of the second preferentially peelable seal.

8. A flexible container as defined in claim 7, wherein the compound curvature of the first preferentially peelable seal defines at least one stress riser characterized by an inflection point having a convex contour oriented in the direction of the diluent compartment.

9. A flexible container as defined in claim 8, wherein the compound curvature of the first preferentially peelable seal further comprises at least a second stress riser characterized by an inflection point having a convex contour oriented in the direction of the medicament compartment.

10. A flexible container as defined in claim 9, wherein the first peelable seal preferentially initiates rupture at an inflection point of a stress riser oriented in the direction of the compartment from which hydraulic pressure is developed.

11. A flexible container as defined in claim 10, wherein the compound curves of the first preferentially peelable seal have a radius of curvature of from about ⅛ inch to about ½ inch.

12. A flexible container as defined in claim 11, wherein the radius of curvature is about ¼ inch.

13. A flexible container as defined in claim 12, wherein the first preferentially peelable seal has a width dimension of from about 1/16 inches to about 3/16 inches.

14. A flexible container as defined in claim 13, wherein the first preferentially peelable seal has a width of about ⅛ inches or 3 millimeters.

15. A flexible container as defined in claim 14, wherein the second preferentially peelable seal has a width of from about 3/16 inches to about 5/16 inches.

16. A flexible container as defined in claim 5 or claim 15, wherein the peelable seals are constructed to provide a uniform burst characteristic to hydraulic pressure against the seal caused by manipulation of the container, the uniform burst characteristic causing the seal to peel-open at a predetermined applied pressure uniform to within ±2 psi.

17. A flexible container as defined in claim 5, wherein the first preferentially peelable seal has a width dimension of from about 3 millimeters to about 7 millimeters, and wherein the second preferentially peelable seal has a width dimension of from about 7 millimeters to about 12 millimeters.

18. A flexible container as defined in claim 17, wherein the first preferentially peelable seal has a width dimension of about 6 millimeters, and wherein the second preferentially peelable seal has a width dimension of about 10 millimeters.

19. A flexible container for separately storing and mixing liquid diluent and medicament, the container comprising:

a multi-layer laminate rear sheet including an inner layer of a polypropylene-polyethylene copolymer blended with a styrene ethylene-butylene styrene elastomer, an opaque high-barrier intermediate layer, and an outer high temperature resistant mold release layer;

a flexible front sheet constructed of a single layer film of a polypropylene-polyethylene copolymer blended with styrene ethylene-butylene styrene elastomer interfacing with the rear sheet, the front sheet sealed to the rear sheet along a common peripheral edge;

at least two preferentially peelable seals commonly extending from at least one side of the common peripheral edge and separably joining the front and rear sheets to define at least a first compartment containing a liquid medicament; and a third peelable seal extending between the at least two preferentially peelable seals and joining together their ends opposite the ends extending from the container peripheral edge, the third peelable seal formed parallel to and spaced-away from a second container peripheral edge, the two preferentially peelable seals and the third peelable seal configured to define a compartment containing a liquid diluent, an outlet area and a channel configured to provide fluid communication therebetween.

20. A flexible container for separately storing and mixing liquid diluent and medicament, the container comprising:

a multi-layer laminate rear sheet including an inner layer of a polypropylene-polyethylene copolymer blended with a styrene ethylene-butylene styrene elastomer, an opaque high-barrier intermediate layer, and an outer high temperature resistant mold release layer;

a flexible front sheet constructed of a single layer film of a polypropylene-polyethylene copolymer blended with styrene ethylene-butylene styrene elastomer interfacing with the rear sheet, the front sheet sealed to the rear sheet along a common peripheral edge; and first and second preferentially peelable seals extending between two parallel sides of the common peripheral edge and separably joining the front and rear sheets to define at least a first compartment containing a liquid medicament, the first and second preferentially peelable seals being rupturable in response to hydraulic pressure developed by manipulating the container, each seal configured with a respective different rupture characteristic such that the first preferentially peelable seal ruptures before the second preferentially peelable seal regardless of whether or not the hydraulic pressure is developed in the medicament compartment.

21. A flexible container as defined in claim 19, wherein the at least two preferentially peelable seals comprise a first preferentially peelable seal disposed between the medicament compartment and the diluent compartment, and a second preferentially peelable seal disposed between the medicament compartment and the outlet area.

22. A flexible container as defined in claim 20 or 21, wherein the first preferentially peelable seal is formed as a compound curve, and wherein the second preferentially peelable seal is substantially rectangular.

23. A flexible container as defined in claim 22, wherein the first and second preferentially peelable seals are each characterized by a width dimension, and wherein the width dimension of the first preferentially peelable seal is substantially smaller than the width dimension of the second preferentially peelable seal.

24. A flexible container as defined in claim 23, wherein the compound curvature of the first preferentially peelable seal defines at least one stress riser characterized by an inflection point having a convex contour oriented in the direction of the diluent compartment.

25. A flexible container as defined in claim 24, wherein the compound curvature of the first preferentially peelable seal further comprises at least a second stress riser characterized by an inflection point having a convex contour oriented in the direction of the medicament compartment.

26. A flexible container as defined in claim 25, wherein the first preferentially peelable seal preferentially initiates rupture at an inflection point of a stress riser oriented in the direction of the compartment from which hydraulic pressure is developed.

27. A flexible container as defined in claim 26, wherein the compound curves of the first preferentially peelable seal have a radius of curvature of from about 1/8 inch to about 1/2 inch.

28. A flexible container as defined in claim 27, wherein the first preferentially peelable seal has a width dimension of from about 1/16 inches to about 3/16 inches.

29. A flexible container as defined in claim 28, wherein the second preferentially peelable seal has a width of from about 3/16 inches to about 5/16 inches.

30. A flexible container as defined in claim 29, further comprising a fourth peelable seal disposed in the outlet area and extending between two parallel sides of the container's common peripheral edge, the fourth seal separably joining the front and rear sheets to define an outlet compartment separate from the outlet area.

31. A flexible container as defined in claim 29, wherein the fluid communication channel formed between the diluent compartment and outlet area transfers hydraulic pressure developed in the diluent compartment to the outlet area such that hydraulic pressure on the first preferentially peelable seal and the second preferentially peelable seal is substantially equalized.

32. A flexible container as defined in claim 31, wherein the peelable seals are constructed to provide a uniform burst characteristic to hydraulic pressure against the seal caused by manipulation of the container, the uniform burst characteristic causing the seal to peel-open at a predetermined applied pressure uniform to within ±2 psi.

33. A flexible container for combined storage and administration of liquid medicaments comprising:

a flexible rear sheet;

a flexible front sheet sealed to the rear sheet along a common peripheral edge;

a peelable seal extending between two sides of the common peripheral edge and separably joining the front and rear sheets to define an outlet compartment and a compartment containing a liquid medicament, wherein the medicament compartment is substantially completely filled with liquid medicament such that there is no gaseous head space in the compartment; and means, integral to the container, for establishing a meniscus above the liquid medicament when the container is accessed for VI administration.

34. A flexible container as defined in claim 33, wherein the peelable seal is constructed to provide a uniform resistance characteristic to hydraulic pressure against the seal caused by manipulation of the container, the uniform resistance characteristic causing the seal to peel-open at a predetermined applied pressure uniform to within ±2 psi.

35. A flexible container as defined in claim 34, wherein the outlet compartment contains a volume of air, said volume of air forming a meniscus above the liquid medicament upon rupture of the peelable seal caused by manipulation of the container.

36. A flexible container as defined in claim 35, wherein the flexible front sheet is constructed of a single layer film of a polypropylene-polyethylene copolymer blended with styrene ethylene-butylene styrene elastomer.

37. A flexible container as defined in claim 36, wherein the flexible rear sheet is constructed of a single layer film of a polypropylene-polyethylene copolymer blended with styrene ethylene-butylene styrene elastomer.

38. A flexible container as defined in claim 36, wherein the flexible rear sheet is constructed of a multi-layer laminate including an inner layer of a polypropylene-polyethylene copolymer blended with styrene ethylene-butylene styrene elastomer, said inner layer interfacing with the flexible front sheet.

39. A flexible container as defined in claim 38, the multi-layer laminate rear sheet further including an opaque high-barrier intermediate layer and an outer high temperature resistant mold release layer.

40. A flexible container as defined in claim 39, wherein the polypropylene-polyethylene copolymer of the front and rear sheets is blended with styrene ethylene-butylene styrene elastomer in an about 80%/20% wt/wt ratio.

* * * * *

UNITED STATES PATENT AND TRADEMARK OFFICE
CERTIFICATE OF CORRECTION

PATENT NO. : 5,928,213
DATED : July 27, 1999
INVENTOR(S) : Ward W. Barney; Steven L. Smith It is certified that error appears in the above-identified patent and that said Letters Patent is hereby corrected as shown below:

Column 1, line 54, before "physiological" delete "a".
Column 8, line 3, replace "diluent in" with -- diluent, --.
Column 9, line 21, replace "effecting" with -- affecting --.
Column 10, line 59, replace "loosing" with -- losing --.
Column 15, line 31, replace "container is" with -- container if --.
Column 21, line 7, replace "semi-schematic schematic form" with
    -- semi-schematic form --.
Column 25, line 66, replace "±1 lbs. pounds" with -- ±1 pound --.
Column 26, line 6, after "apparatus" insert -- is --.
Column 27, line 12, replace "manufacture" with -- manufactured --.
Column 27, line 50, before "of liquid" delete "suitably comprises
    a volume --.
Column 30, line 9, after "as $V_f$" insert a period.
Column 30, line 27, after "nitrogen $(N_2)$" insert a period.
Column 34, line 44, replace "VI administration" with
    -- IV administration --.

Signed and Sealed this

Seventeenth Day of April, 2001

Attest:

NICHOLAS P. GODICI

*Attesting Officer*    *Acting Director of the United States Patent and Trademark Office*